United States Patent [19]

Sumida et al.

[11] Patent Number: 5,364,669
[45] Date of Patent: Nov. 15, 1994

[54] COMPOSITE FILMS

[75] Inventors: Katsuhiko Sumida; Yuji Iseki; Masahiko Suzuki, all of Amagasaki, Japan

[73] Assignee: Daicel Chemical Industries, Ltd., Sakai, Japan

[21] Appl. No.: 859,400

[22] PCT Filed: Sep. 28, 1990

[86] PCT No.: PCT/JP90/01247
§ 371 Date: May 28, 1992
§ 102(e) Date: May 28, 1992

[87] PCT Pub. No.: WO92/05954
PCT Pub. Date: Apr. 16, 1992

[51] Int. Cl.$^5$ .................. C09K 19/00; B32B 27/00
[52] U.S. Cl. ............................ 428/1; 428/412; 428/423.5; 428/423.7; 428/424.4; 428/451; 428/448; 428/474.9; 428/476.1; 428/482; 428/483; 428/516; 428/520; 428/913
[58] Field of Search ............. 428/1, 412, 423.5, 423.7, 428/424.4, 451, 448, 474.9, 476.1, 482, 483, 516, 520, 913

[56] References Cited

U.S. PATENT DOCUMENTS 4,997,724 3/1991 Suzuki et al. .................. 428/1

FOREIGN PATENT DOCUMENTS

| | | |
|---|---|---|
| 0133552 | 2/1985 | European Pat. Off. . |
| 0184368 | 6/1986 | European Pat. Off. . |
| 0343422 | 11/1989 | European Pat. Off. . |
| 0466085 | 1/1992 | European Pat. Off. . |
| 61-206628 | 9/1986 | Japan . |
| 62-55130 | 3/1987 | Japan . |
| 2253949 | 10/1990 | Japan . |
| 2253951 | 10/1990 | Japan . |
| 4135750 | 5/1992 | Japan . |
| 4136038 | 5/1992 | Japan . |
| 2166685 | 5/1986 | United Kingdom . |

*Primary Examiner*—P. C. Sluby
*Attorney, Agent, or Firm*—Spencer, Frank & Schneider

[57] ABSTRACT

A composite film comprising, at least, a liquid crystal polymer layer containing a thermotropic liquid crystal polymer, and a thermoplastic polymer layer laminated on at least one surface of the liquid crystal polymer layer. The thermoplastic polymer layer may be formed with an adhesive thermoplastic polymer layer having adhesive properties with respect to the liquid crystal polymer layer. The adhesive thermoplastic polymer layer is formed preferably by a modified polyolefin into which a functional group is being introduced, or a modified polyester, A thermoplastic polymer layer such as a polyalkylene terephthalate layer or olefin polymer layer may further be laminated on the adhesive thermoplastic polymer layer.

27 Claims, 1 Drawing Sheet

COMPOSITE FILMS

CROSS-REFERENCE TO RELATED APPLICATION

This application is the national stage of international application No. PCT/JP90/01247 filed Sep. 28th, 1990, the specification of which is hereby incorporated by reference.

TECHNICAL FIELD

The present invention relates to a composite film containing a liquid crystal polymer layer, to be suitably used as a packaging film and etc.

BACKGROUND ART

As packaging films, there are generally used oriented or stretched films of polypropylene and polyethylene terephthalate. However, the polypropylene film is poor in oxygen gas barrier characteristics, while the polyethylene terephthalate film is poor in moisture resistance, i.e., water vapor barrier properties.

There is also generally used a composite film obtainable by laminating polypropylene films on both surfaces of a film of a saponified ethylene-vinyl acetate copolymer through adhesive layers containing maleic anhydride modified polypropylene. In such a composite film, however, the oxygen gas barrier characteristics of the film of the saponified ethylene-vinyl acetate copolymer are considerably decreased when the film absorbs moisture. For example, the oxygen gas barrier characteristics are decreased by about 10 to 40 times after a treatment of retort sterilization. This makes it difficult to preserve foods or the like for a long period of time with such a composite film. Further, due to the polymer components, this composite film is poor in heat resistance and produces a smell of potyolefin particularly when the film is heated.

There is also known a composite film obtainable by laminating polypropylene films on both surfaces of a film of polyvinylidene chlorides through layers of an ethylene-vinyl acetate copolymer. However, such a composite film is decreased in gas barrier characteristics due to a plasticizer or a stabilizer so added as to impart a molding ability to the polyvinylidene chloride polymers. Further, since the glass transition temperature of the polyvinylidene chloride polymers is low, the polyvinylidene chloride polymers are apt to be plasticized as the temperature is raised. This decreases the gas barrier characteristics of this composite film at a high temperature. Further, this composite film is poor in heat resistance due to the polymer components.

As a film excellent in heat resistance, a polyethylene terephthalate film is known. Accordingly, it may be proposed to co-extrude such a polyethylene terephthalate film and the polyvinylidene chloride film above-mentioned to form a laminated film. In the polyvinylidene chloride polymer, the melting point is located in the vicinity of the decomposition temperature, and the polyvinylidene chloride polymer is decomposed at a temperature from about 180 to about 200° C. It is therefore difficult to make a film by co-extending and laminating, by a molding method, the polyvinylidene chloride polymer and polyethylene terephthalate excellent in heat resistance. Even though the polyvinylidene chloride polymer layer and polyethylene terephthalate layer are laminated on each other, heat sealing properties may not be assured. Accordingly, the resultant film may be used to considerably limited applications only.

As thus described, the packaging films are considerably different from one another in the characteristics of polymer components thereof. It is therefore difficult that a one-type film simultaneously satisfies a plurality of characteristics. Accordingly, a variety of packaging films are respectively used according to the purposes.

A liquid crystal polymer classified in engineering plastics is excellent in mechanical properties, dimensional stability, heat resistance, chemical stability and electric properties. Thus, attention is given to the liquid crystal polymer as a polymer film satisfying a variety of requirements. Japanese Patent Publication No. 42287/1985 describes that the liquid crystal polymer film may be divided to form highly elastic split fibers. As apparent from this description, such a film tends to orient in the polymer flowing direction, and is extremely weak in strength in the widthwise direction (hereinafter referred to as TD direction) at a right angle to the film drawing direction (hereinafter referred to as MD direction). To improve the strength of the liquid crystal polymer film in the TD direction, Japanese Patent Application Laid-Open No. 46728/1981 and No. 102234/1986 disclose a method of preparing a biaxially oriented or stretched film by increasing the blow ratio at the time when the film is molded by an inflation method. Japanese Patent Application Laid-Open No. 2127/1981 and No. 173620/1988 disclose a method in which a ring die is rotated at the time when a liquid crystal polymer film is molded by an inflation method. Japanese Patent Application Laid-Open No. 59818/1983 discloses a method in which a porous plate-like member having a plurality of fine gaps which can be heated, is formed inside a T-die. Further, Japanese Patent Application Laid-Open No. 31729/1988 discloses a method using a three-layer co-extrusion die, by which both external layers outside of the intermediate layer of a liquid crystal polymer are formed by thermoplastic polymers which are not adhesive to the liquid crystal polymer, and, after the three layers have been coextruded, the external layers are separated, thereby to obtain the liquid crystal polymer film of the intermediate layer.

However, the liquid crystal polymer films thus obtained are still weak in strength in the TD direction with respect to the MD direction, and are large in mechanical anisotropic properties. Likewise polyethylene terephthalate, the liquid crystal polymer film does not have sufficient thermal adhesive properties. It is therefore not possible to pack an article with such a film by heat seal. Thus, the application of such a film is considerably limited.

It is a main object of the present invention to provide a composite film capable of satisfying a variety of requirements.

It is another object of the present invention to provide a composite film containing, as an element, a liquid crystal polymer layer, yet assuring excellent heat adhesive properties.

It is a further object of the present invention to provide a composite film not only assuring excellent gas barrier characteristics even though exposed to an atmosphere of a high temperature and a high humidity, but also having heat sealing properties.

It is still another object of the present invention to provide a composite film excellent in heat resistance which produces no smell of polyolefin.

It is still the further object of the present invention to provide a composite film containing a liquid crystal polymer layer improved extremely in the mechanical anisotropic properties.

DISCLOSURE OF THE INVENTION

The inventors have studied intensively and found that a thermotropic liquid polymer has excellent gas barrier characteristics, and that the above objects may be accomplished by laminating and compounding a liquid crystal polymer layer containing a liquid crystal polymer with a thermoplastic polymer layer. The present invention is completed based on these findings. The present invention provides a composite film comprising, at least, a liquid crystal polymer layer containing a thermotropic liquid crystal polymer, and a thermoplastic polymer layer laminated on at least one surface of the liquid crystal polymer layer.

Examples of the thermotropic liquid crystal polymer include a polyester, a polythiol ester, a polyester amide, a polyazomethine and a polyester carbonate. Fully aromatic polyesters and fully aromatic polyester amides are preferably as the liquid crystal polymer. The preferred liquid crystal polymer layer is lesser in mechanical anisotropic properties.

The thermoplastic polymer layer is laminated on the liquid crystal polymer layer through a adhesive layer or without the adhesive layer. Where the thermoplastic polymer layer is laminated, through the adhesive layer, on the liquid crystal polymer layer, the thermoplastic polymer layer may be formed with various thermoplastic polymers such as polyalkylene terephthalates, olefin polymers, nylons, polycarbonates and the like. When the thermoplastic polymer layer is laminated directly on the liquid crystal polymer layer, the thermoplastic polymer layer may be formed with an adhesive thermoplastic polymer having adhesive properties relative to the liquid crystal polymer layer.

The adhesive thermoplastic polymer presents high adhesive properties to the liquid crystal polymer layer and a variety of polymer layers such as a polyalkylene terephthalate layer, an olefin polymer layer and the like. Accordingly, composite films having a variety of lamination structures may be formed with the use of the adhesive thermoplastic polymer. The composite film may be formed by laminating a polyalkylene terephthalate layer, an olefin polymer layer, a nylon layer, or a polycarbonate layer on at least one surface of the liquid crystal polymer layer through the adhesive thermoplastic polymer layer. The composite film may be formed by laminating a polyalkylene terephthalate layer on one surface of the liquid crystal polymer layer through the adhesive thermoplastic polymer layer, and an olefin polymer layer on the other surface of the liquid crystal polymer layer through the adhesive thermoplastic polymer layer. The composite film may be formed by respectively laminating polyalkylene terephthalate layers on both surfaces of the liquid crystal polymer layer through the adhesive thermoplastic polymer layers.

Typical examples of the adhesive thermoplastic polymer which is adhesive to the liquid crystal polymer layer include a modified polyolefin and a polyester. The polyesters contained in the adhesive thermoplastic polymer layer are other polyesters than polyalkylene terephthalates and liquid crystal polyesters, and refers to polyesters adhesive to the liquid crystal polymer layer. Introduced in the modified polyolefin is at least one functional group selected from the group consisting of carboxyl group, glycidyl group, an alkoxysilane group, hydroxyl group, an alkoxy group, an alkoxycarbonyl group and amino group.

A preferable adhesive thermoplastic polymer has heat-sealing properties or hot-melt adhesive properties.

In the specification, the term "liquid crystal polymer" refers to a thermotropic liquid crystal polymer and its compositions adapted to be moldable as flowingly softened when heated, and also adapted to form an anisotropic molten phase presenting birefringence when molten.

The term "film" refers to all relatively thin and substantially flat structures which may also be called "sheets" in the technical field to which the present invention pertains.

DETAILED DESCRIPTION OF THE INVENTION

Figure 1:
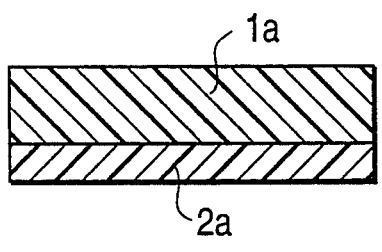
FIGS. 1 to 5 are schematic section views, each illustrating the lamination structure of a composite film in accordance with the present invention.

As to the liquid crystal polymer which may be used in the present invention, there may be referred to, for example, U.S. Pat. Nos. 4,726,998 and 4,717,624. Components of the liquid crystal polymer contained in the composite film are as follows:

(1) at least one component of aromatic dicarboxylic acids and alicyclic dicarboxylic acids;
(2) at least one component of aromatic diols, alicyclic diols and aliphatic diols;
(3) at least one component of aromatic hydroxy carboxylic acids;
(4) at least one component of aromatic thiol carboxylic acids;
(5) at least one component of aromatic dithiols and aromatic thiolphenols; and
(6) at least one component of aromatic hydroxy amines and aromatic diamines.

Liquid crystal polymers may be composed of any of the following combinations:

(i) polyesters comprising the components (1) and (2);
(ii) polyesters comprising the component (3);
(iii) polyesters comprising the components (1), (2) and (3);
(iv) polythiol esters comprising the component (4);
(v) polythiol esters comprising the components (1) and (5);
(vi) polythiol esters comprising the components (1), (4) and (5);
(vii) polyester amides comprising the components (1), (3) and (6); and
(viii) polyester amides comprising the components (1), (2), (3) and (6).

The liquid crystal polymers include aromatic polyazomethines and polyester carbonates which are not included in the category of the combinations of the above-listed components. Typical examples of polyazomethines include poly (nitrilo-2-methyl-1,4-phenylenenitrilo-ethylidyne-1,4-phenyleneethylidyne), poly(nitrilo-2-methyl-1,4-phenylenenitrilomethylidyne-1,4-phenylene-methylidyne), poly(nitrilo-2-chloro-1,4-phenylene-nitrilomethylidyne-1,4-phenylenemethylidyne) and the like. Polyester carbonates substantially contain 4-oxybenzoyl, dioxyphenyl, dioxycarbonyl and terephthaloyl units.

As typical examples of aromatic dicarboxylic acids, there may be mentioned terephthalic acid, 4,4'-diphenyldicarboxylic acid, 4,4'-triphenyldicarboxylic acid, 2,6-naphthalenedicarboxylic acid, diphenyl ether-4,4'-dicarboxylicacid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, naphthalene-1,6-dicarboxylic acid, etc.; and an alkyl-, an alkoxy-, or a halogen-substituted derivatives of the above aromatic dicarboxylic acids such as chloroterephthalic acid, dichloroterephthalic acid, bromoterephthalic acid, methylterephthalic acid, dimethylterephthalic acid, ethylterephthalic acid, methoxyterephthalic acid, ethoxyterephthalic acid and the like.

As alicyclic dicarboxylic acids, there may be mentioned, for example, trans-1,4-cyclohexanedicarboylic acid, cis-1,4-cyclo-hexanedicarboxylic acid, 1,3-cyclohexanedicarboxylic acid, etc.; and an alkyl-, an alkoxy-, or a halogen-substituted derivatives of the above alicyclic dicarboxylic acids such as trans-1,4-(1-methyl) cyclohexanedicarboxylic acid, trans-1,4-(1-chloro) cyclohexanedicarboxylic acid and the like.

As typical examples of aromatic diols, there may be mentioned hydroquinone, resorcinol, 4,4'-dihydroxydiphenyl, 4-4'-dihydroxytriphenyl, 2,6-naphalenediol, 4,4'-dihydroxydiphenyl ether, bis(4-hydroxyphenoxy)ethane, 3,3'-dihydroxydiphenyl, 3,3'-dihydroxydiphenyl ether, 1,6-naphthalenediol, 2,2-bis(4-hydroxyphenyl)propane, 1,1-bis(4-hydroxyphenyl)methane and the like; and an alkyl-, an alkoxy-, or a halogen-substituted derivatives of the above aromatic diols such as chlorohydroquinone, methylhydroquinone, 1-butylhydroquinone, phenylhydroquinone, methoxyhydroquinone, phenoxyhydroquinone, 4-chlororesorcinol, 4-methylresorcinol etc.

Examples of alicyclic diols include trans-1,4-cyclohexanediol, cis-1,4-cyclohexanediol, trans-1,4-cyclohexanedimethanol, trans-1,3-cyclohexanediol, cis-1,2-cyclohexanediol, trans-1,3-cyclohexanedimethanol, etc.; and an alkyl-, an alkoxy-, or a halogen-substituted derivatives of the above alicyclic diols such as trans-1,4-(1-methyl)cyclohexanediol and trans 1,4-(1-chloro)-cyclohexanediol, etc.

Typical examples of aliphatic diols include straight-chain and branched aliphatic diols such as ethylene glycol, 1,3-propanediol, 1,4-butanediol, neopentyl glycol, etc.

As examples of aromatic hydroxycarboxylic acids, there may be mentioned 4-hydroxybenzoic acid, 3-hydroxybenzoic acid, 6-hydroxy-2-naphthoic acid, 6-hydroxy-1-naphthoic acid and the like; and an alkyl-, an alkoxy-, or a halogen-substituted derivatives of the aromatic hydroxycarboxylic acids such as 3-methyl-4-hydroxybenzoic acid, 3,5-dimethyl-4-hydroxybenzoic acid, 2,6-dimethyl-4-hydroxbenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, 6-hydroxy-5,7-dichloro-2-naphthoic acid and the like.

As examples of aromatic mercapto carboxylic acids, there may be mentioned 4-mercaptobenzoic acid, 3-mercaptobenzoic acid, 6-mercapto-2-naphthoic acid, 7-mercapto-2-naphthoic acid, etc.

Aromatic dithiols include, for example, benzene-1,4-dithiol, benzene-1,3-dithiol, 2,6-naphthalenedithiol, 2,7-naphthalenedithiol, etc.

Aromatic mercapto phenols include, for example, 4-mercaptophenol, 3-mercaptophenol, 2-mercaptophenol, etc.

Examples of aromatic hydroxy amines and aromatic diamines include 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino1-naphthol, 4-amine-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminodiphenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), 4,4'-diaminodiphenyl ether (oxydianiline), etc.

The above-listed polymers include those which may present, when molten, no birefringence dependent on the constituent components, the ratio of the components in the polymer and sequence distribution. The polymers to be used in the present invention are limited to those which present birefringence when molten.

As to a method of manufacturing a liquid crystal polymer to be used in the present invention, it is possible to refer to any of conventional methods, for example, those disclosed in the U.S. Pat. Nos. 4,726,998 and 4,717,624 mentioned earlier.

Fully aromatic polymers suitably used in the present invention tend to be substantially insoluble in common solvents, and therefore are unsuitable for solution processing. However, such polymers may be readily processed by a normal melt processing. Particularly preferable fully aromatic polymers are somewhat soluble in pentafluorophenol.

In the liquid crystal polymer used in the present invention, the molecular weight may be in such a suitable range as not to impair the film forming properties or the like. For example, weight-average molecular weights of the preferred fully aromatic polyesters are usually in the range of about 2,000 to 200,000, preferably about 10,000 to 50,000, and more preferably about 20,000 to 25,000. Molecular weights of the preferred fully aromatic polyester amides are usually in a range from about 5,000 to 50,000, preferably about 10,000 to 30,000, for example, 15,000 to 17,000. These molecular weights can be measured by gel permeation chromatography and other standard methods not causing dissolution of polymers, for example, determination of terminal groups by the infrared spectrophotometry of a compression-formed film. The molecular weights may also be measured by preparing a pentafluorophenol solution and using a light scattering method.

When dissolved in pentafluorophenol at a concentration of 0.1 wt% at 60° C, the fully aromatic polyester amides generally show an intrinsic viscosity (I.V.) of at least about 2.0 dl/g, for example, in a range from about 2.0 to 10.0 dl/g.

The preferred polyesters forming an anisotropic molten phase contain repeating units comprising naphthalene moieties, such as 6-hydroxy-2-naphthalene, 2,6-dihydroxynaphthalene, and 2,6-dicarboxynaphthalene in quantities larger than about 10 mol %. The preferred polyester amides contain repeating units of the above said naphthalene moieties and the other moieties comprising 4-aminophenol or 1,4-phenylenediamine. More specifically, polyesters and polyester amides are as follows:

(A) Polyesters substantially composed of the following repeating units I and II:

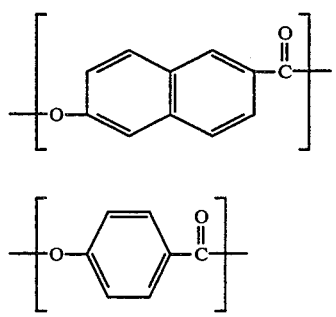

The polyesters contain about 10 to 90 mol % of the unit I and about 10 to 90 mol % of the unit II. In one aspect, the unit I is present in a quantity ranging from about 65 to 85 mol % (e.g., about 75 mol %). In another aspect, the unit II is present in a quantity of as small as about 15 to 35 mol %, preferably 20 to 30 mol %. At least one hydrogen atom bonded to the ring may be substituted by a substituent selected from the group consisting of an alkoxy group having 1 to 4 carbon atoms, a halogen atom, phenyl group, a substituted phenyl group and a combination of these groups.

(B) Polyesters substantially composed of the following repeating units II, III and IV:

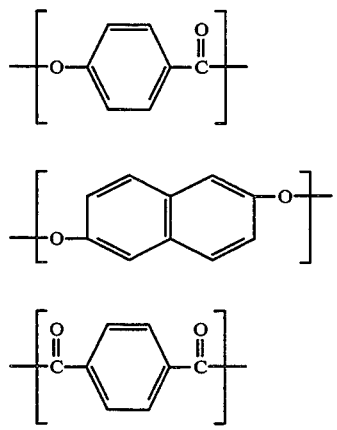

The polyesters contain about 30 to 70 mol % of the unit II. Polyesters are preferably composed of about 40 to 60 mol % of the unit II, about 20 to 30 mol % of the unit III and about 20 to 30 mol % of the unit IV. At least one hydrogen atom bonded to the ring may be substituted by a substituent selected from the group consisting of an alkoxy group having 1 to 4 carbon atoms, a halogen atom, phenyl group, a substituted phenyl group and a combination of these groups.

(C) Polyesters substantially composed of the following repeating units II, IV, V and VI:

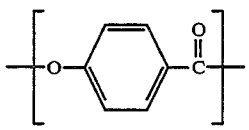

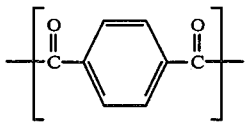

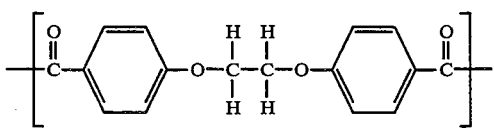

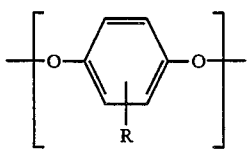

(wherein R represents methyl group, chloro, bromo, or the combination thereof, which is a substituent for the hydrogen atom of the aromatic ring).

The polyesters are composed of about 20 to 60 mol of the unit II, about 5 to 35 mol % of the unit V, about 5 to 18 mol % of the unit V and about 20 to 40 mol % of the unit VI, preferably, about 35 to 45 mol % of the unit II, about 15 to 25 mol % of the unit IV, about 10 to 15 mol % of the unit V and about 25 to 35 mol % of the unit VI. The total molar concentration of the units IV and V is substantially equal to that of the unit VI. At least one hydrogen atom bonded to the ring may be substituted by a substituent selected from the group consisting of an alkyl group having 1 to 4 carbon atoms, an alkoxy group having 1 to 4 carbon atoms, a halogen atom, phenyl group, a substituted phenyl group and a combination of these groups. The fully aromatic polyesters generally show an intrinsic viscosity of at least 2.0 dl/g, for example 2.0 to 10.0 dl/g, when dissolved in pentafluorophenol at a concentration of 0.3 w/v % at a temperature of 60° C, (D) Polyesters substantially composed of the following repeating units I, II, VII and VIII:

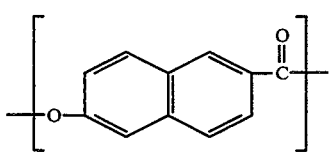

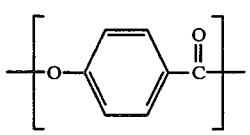

A Dioxyaryl unit VII represented by the general formula:

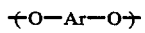 VII (wherein Ar represents a bivalent group containing least one aromatic ring).

A dicarboxyaryl unit VIII represented by the following general formula:

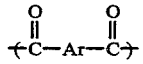 VIII (wherein Ar has the same meaning as defined above).

The polyesters are composed of about 20 to 40 of the unit I, from more than 10 up to about 50 mol % of the unit II, from more than 5 up to about 30 mol % % of the unit VII and from more than 5 up to about 30 mol of the unit VIII, preferably about 20 to 30 mol % (for example, about 25 mol %) of the unit I, about 25 to 40 mol % (for example, about 35 mol %) of the unit II, about 15 to 25 mol % (for example, about 20 mol %) of the unit VII and about 15 to 25 mol % (for example, about 20 mole %) of the unit VIII. At least one hydrogen atom bonded to the ring may be substituted by substituent selected from the group consisting of an alkyl group having 1 to 4 carbon atoms, an alkoxy group having 1 to 4 carbon atoms, a halogen atom, phenyl group, a substituted phenyl group and a combination of these groups.

The units VII and VIII are preferably symmetrical in the sense that bivalent bonds which bond these units to other units on both sides in main chains of polymers are positionally symmetrical on one or two aromatic rings (for example, these units are in positions of para with each other or on the diagonal ring when present on the naphthalene ring). However, nonsymmetrical units such as those derived from resorcinol or isophthalic acid are also usable.

The preferable dioxyaryl unit VII is;

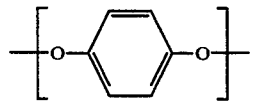

and the preferable dicarboxyaryl unit VIII is:

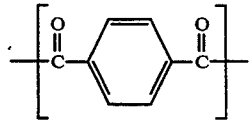

(E) Polyesters substantially composed of the following repeating units I, VII and VIII:

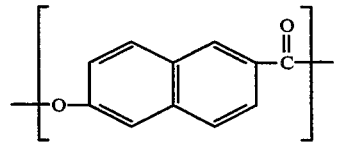 I

A dioxyaryl unit VII represented by the following general formula:

 VII (wherein Ar has the same meaning as defined above).

A dicarboxyaryl unit VIII represented by the following general formula:

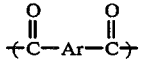 VIII (wherein Ar has the same meaning as defined above).

The polyesters are composed of about 10 to 90 mol % of the unit I, 5 to 45 mol % of the unit VII and 5 to 45 mol % of the unit VIII, preferably about 20 to 80 mol % of the unit I, about 10 to 40 mol % of the unit VII and about 10 to 40 mol % of the unit VIII. More desirably, the polyesters are composed of about 60 to 80 mol % of the unit I, about 10 to 20 mol % of the unit VII and about 10 to 20 mol % of the unit VIII. At least one hydrogen atom may be substituted by a substituent selected from the group consisting of an alkyl group having 1 to 4 carbon atoms, an alkoxy group having 1 to 4 carbon atoms, a halogen atom, phenyl group, a substituted phenyl group and a combination of these groups.

The preferred dioxyaryl unit VII is;

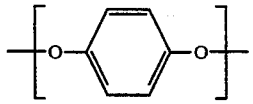

and the preferred dicarboxyaryl unit VIII is:

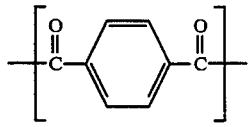

(F) Polyester amides substantially composed of the following repeating units I, IX, X and VII:

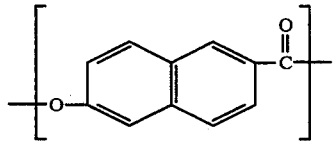 I

A unit IX represented by the following general formula:

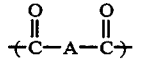 IX (wherein A represents a bivalent group containing at least one aromatic ring or a bivalent trans-cyclohexane group).

A unit X represented by the following general formula:

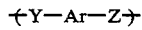 X (wherein Ar has the same meaning as defined above; Y represents O, NH, or NR; Z represents NH or NR, and R represents an alkyl group having 1 to 6 carbon atoms or an aryl group).

A unit VII represented by the following general formula:

  VII (wherein Ar has the same meaning as defined above).

The polyester amides are composed of about 10 to mol % of the unit I, about 5 to 45 mol % of the unit IX, about 5 to 45 mol % of the unit X and about 0 to 40 mol % of the unit VII. At least one hydrogen atom bonded to the ring may be substituted by a substituent selected from the group consisting of an alkyl group having 1 to 4 carbon atoms, an alkoxy group having 1 to 4 carbon atoms, a halogen atom, phenyl group, a substituted phenyl group and a combination of these groups.

The preferred dicarboxyaryl unit IX is;

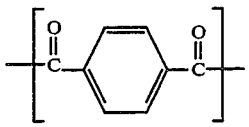

the preferred unit X is;

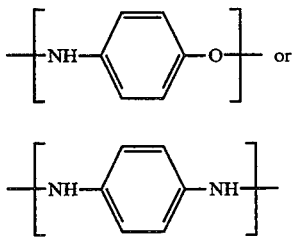 or and the preferred dioxyaryl unit VII is:

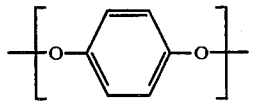

Polymers which form an anisotropic molten phase according to the present invention include one wherein one part of a polymer chain is composed of a segment of a polymer forming an anisotropic molten phase as described above and the other part of the polymer chain is composed of a segment of a thermoplastic resin not forming an anisotropic molten phase.

The liquid crystal polymer above-mentioned is excellent in heat resistance and also excellent in gas barrier characteristics at an ambient temperature and a high temperature. In the liquid crystal polymer, the dependency of the gas barrier characteristics on temperature is considerably small. For example, even though subjected to a treatment of retort sterilization, the liquid crystal polymer is not decreased in gas and vapor barrier characteristics. The liquid crystal polymer has thermal deformation temperature of 80° to 400° C., and preferably 120° to 350° C. Particularly, the liquid crystal polymer having the thermal deformation temperature of about 150° to about 250° C. is excellent in film forming properties.

The elastic modulus of the liquid crystal polymer is in the range of $6.0 \times 10^4$ to $2.5 \times 10^5$ kgf/cm², preferably $7.5 \times 10^4$ to $2.5 \times 10^5$ kgf/cm², and more preferably $9.0 \times 10^4$ to $2.5 \times 10^5$ kgf/cm². The tensile strength of the liquid crystal polymer is in the range of 1,000 to 3,000 kgf/cm², preferably 1,500 to 3,000 kgf/cm² and more preferably 1,800 to 3,000 kgf/cm². Thus, the liquid crystal polymer is excellent in mechanical characteristics. The liquid crystal polymer presents oxygen and carbon dioxide gas permeability of 10 cc/m²·25 μm·24 hours·atm or less, preferably 5 cc/m²·25 μm·24 hours·atm or less, and more preferably 1.0 cc/m²·25 μm·24 hours·atm or less. Further, the liquid crystal polymer exhibits vapor permeability of 8 g/m²·25 μm·24 hours·atm or less, preferably 4 g/m²·25 μm·24 hours·atm or less, and more preferably 1.5 g/m²·25 μm·24 hours·atm or less. Thus, the liquid crystal polymer is also excellent in gas barrier characteristics. Furthermore, even though the polymer is left in an atmosphere of a temperature of 70° C. and a relative humidity of 96% for 500 hours, the polymer undergoes a change as small as about 0.003 to 0.02%. This proves that the polymer is excellent in dimensional stability. Thus, the composite films having a liquid crystal polymer layer are excellent in mechanical properties, heat resistance properties, gas barrier properties, dimensional stability and the like, and therefore, one composite film may satisfy a variety of requirements.

The preferred liquid crystal polymer layer of the composite films has small mechanical anisotropic properties. When the tensile elastic modulus is represented by TM (kgf/cm²) and the tensile strength is represented by TS (kgf/cm²), the liquid crystal polymer layer shows the following characteristics:

(a) TM (kgf/cm²) in the MD direction:

$6 \times 10^4$ kgf/cm² or more, preferably $8 \times 10^4$ to $4 \times 10^5$ kgf/cm², and more preferably $1 \times 10^5$ to $4 \times 10^5$ kgf/cm².

(b) TM (kgf/cm²) in the TD direction:

0.5 to 1.5 times of TM in the MD direction, preferably 0.75 to 1.25 times of TM in the MD direction, and more preferably 0.8 to 1.1 times of TM in the MD direction.

(c) TS (kgf/cm²) in the MD direction:

$3 \times 10^3$ kgf/cm² or more, preferably $3 \times 10^3$ to $7.5 \times 10^3$ kgf/cm², and more preferably $3.2 \times 10^3$ to $6 \times 10^3$ kgf/cm².

(d) TS (kgf/cm²) in the TD direction:

0.5 times or more of TS in the MD direction, preferably 0.75 to 1.25 times of TS in the MD direction, and more preferably 0.8 to 1.1 times of TS in the MD direction.

The composite films containing such liquid crystal polymer layer have greater tensile elastic modulus and tensile strength than polyethylene terephthalate film, and are small in mechanical anisotropic properties, thus the composite films are excellent in mechanical characteristics. The composite films containing the preferred liquid crystal polymer layer show mechanical isotropic properties.

The liquid crystal polymer layer having a small mechanical anisotropic properties exhibits extremely small thermal expansion coefficient and is excellent in dimensional stability.

Thermal expansion coefficient in the MD direction is:

$-1 \times 10^{-5}$ to $+1 \times 10^{-5}$/° C., preferably $-5 \times 10^{-6}$ to $-1 \times 10^{-6}$/° C.

Thermal expansion coefficient in the TD direction is:

$-1 \times 10^{-5}$ to $+2 \times 10^{-5}/°$ C., preferably $1 \times 10^{-5}$ to $+1.5 \times 10^{-5}/°$ C.

The polymer composition forming an anisotropic molten phase and capable of melt processing to be used in the present invention may further contain at least one member selected from the group consisting of other polymers forming an anisotropic molten phase, thermoplastic resins not forming an anisotropic molten phase, thermosetting resins, low-molecular organic compounds, and inorganic substances. In the composition, the polymer forming an anisotropic molten phase may be thermodynamically compatible with the other component of the composition.

Examples of thermoplastic resins are polyethylene, polypropylene, polybutylene, polybutadiene, polyisoprene, polyvinyl acetate, an ethylene-vinyl acetate copolymer, an ethylene-acrylate copolymer, an ethylene-methacrylate copolymer, an ionomer, polyvinyl chloride, polyvinylidene chloride, a polystyrene, an acrylic resin, an ABS resin, an AS resin, an BS resin, a polyurethane, a silicone resin, an fluoro resin, a polyacetal, a polycarbonate, polyethylene terephthalate, polybutylene terephthalate, an aromatic polyester, a polyamide, polyacrylonitrile, polyvinyl alcohol, a polyvinyl ether, a polyether imide, a polyamide imide, a polyether ether imide, a polyether ether ketone, a polyether sulfone, a polysulfone, a polyphenylene sulfide, and a polyphenylene oxide.

Examples of thermosetting resins are a phenolic resin, an epoxy resin, a melamine resin, a urea resin, an unsaturated polyester and an alkyd resin.

As examples of the low-molecular organic compounds, there may be mentioned additives for common thermoplastic and thermosetting resins, such as plasticizers, light-resistant and weather-proof stabilizers, e.g. antioxidants and ultraviolet absorbers, antistatic agents, flame retarders, coloring agents, e.g. dyestuff and pigment, foaming agents, crosslinking agents, e.g. divinyl compounds, peroxides and vulcanizers, and low-molecular organic compounds used as lubricants for improving fluidity and mold releasability.

The inorganic substances include, for example, additives for common thermoplastic and thermosetting resins, that is, ordinary inorganic fibers such as glass, carbon, metallic, ceramic, boron fibers and asbestos; powdery substances such as calcium carbonate, highly dispersible silicic acid, alumina, aluminium hydroxide, talc powder, mica, glass flake, glass bead, quartz powder, silica sand, various metal powders, carbon black, barium sulfate, and calcium sulfate; inorganic compounds such as silicone carbide, boron nitrate, and silicon nitride; and whiskers and metallic whiskers.

The liquid crystal polymer layer contains at least 50% by weight, preferably 75% by weight or more, of the liquid crystal polymer.

No particular restrictions are imposed on the thickness of the liquid crystal polymer layer. The thickness of the liquid crystal polymer layer is generally in the range of 1 to 500 μm, preferably from 5 to 250 μm and more preferably from about 10 to about 150 μm.

On at least one surface of the liquid crystal polymer layer, the thermoplastic polymer layer is laminated through an adhesive layer or without the adhesive layer.

The adhesive layer may be formed by use of a two-component type curable urethane adhesive containing a polyisocyanate component and a polyol component. As the polyisocyanate component, there may be mentioned, for example, aliphatic polyisocyanates such as hexamethylene-1,6-diisocyanate, and the like; aromatic polyisocyanates such as 2,4-tolylene diisocyanate, 2,6-tolylene diisocyanate, diphenylmethane-4,4'-diisocyanate, and the like; alicyclic polyisocyanates such as isophoronediisocyanate and the like. The polyisocyanates may be a polyhydric alcohol-polyisocyanate adduct, dimer or trimer.

As examples of the polyol component, there may be mentioned hydroxyl group-containing polyester polyols which are obtainable by reaction of a polyhydric alcohol and a polybasic carboxylic acid or a lower alkyl ester or acid anhydride thereof; and hydroxyl group-containing polyurethane polyols which are obtainable by reaction of the polyester polyol as mentioned above and the polyisocyanate component. The polyols usually have an average average molecular weight of about 500 to 100,000.

When the thermoplastic polymer layer is laminated on the liquid crystal polymer layer by the adhesive layer, the thermoplastic polymer layer may be formed with a film-formable polymer such as olefin polymers, e.g. polyethylene, polypropylene, ethylene-propylene copolymers, poly(4-methylpentene-1), ionomers, ethylene-ethyl acrylate copolymers, ethylene-vinyl acetate copolymers, etc.; ethylene-vinyl alcohol copolymers; polyvinyl chloride; styrenic polymers, e.g. polystyrene, styrene-acrylonitrile copolymers, styrene-acrylonitrile-butadiene copolymers, etc.; polyalkylene terephthalates, e.g. polyethylene terephthalate, polybutylene terephthalate, etc.; nylons or polyamides; polyacrylonitrile; polycarbonates; polyimides; polyarylates; polyacetals; polyether imides; polyether ether ketones; polyether suflones; polysulfones; polyphenylene sulfides; and polyphenylene ethers. Among these polymer, olefin polymers having low vapor permeability and high heat-sealing properties, and polyalkylene terephthalates, nylons and polycarbonates having low oxygen gas permeability and high heat resistant properties are preferable.

Among polyolefin polymers, there may be preferably used polyethylene (particularly, high-density polyethylene and intermediate-density polyethylene), polypropylene, and an ethylene-propylene copolymer (particularly, an ethylene-propylene copolymer having a melting point of 145° to 160° C.).

Examples of the polyalkylene terephthalates include polyesters containing an alkylene group having about 2 to 6 carbon atoms, and polyesters having a cycloalkylene group, an ether group or the like at part of the alkylene group above-mentioned. Particularly preferable are polyethylene terephthalate, and polyalkylene terephthalates having high heat resistance temperature [for example, PET-G (Trade name of Eastman Chemical Products Co., Ltd.) in which part of ethylene glycol of polyethylene terephthalate is substituted with 1,4-cyclohexanedimethanol, diethylene glycol or the like, and polybutylene terephthalate]. The polyalkylene terephthalates having high heat resistance temperature may be readily compounded with the liquid crystal polymer by a co-extrusion molding method. The PET-G has heat-sealing properties.

The thermoplastic polymer layer is preferably laminated on the liquid crystal polymer layer without the adhesive layer. In this case, the thermoplastic polymer layer may be formed with an adhesive thermoplastic polymer having adhesive properties relative to the liquid crystal polymer layer. The adhesive thermoplastic polymer functions as the thermoplastic polymer and the adhesive. Therefore, a composite film may be obtained by lamination of the liquid crystal polymer layer and the adhesive thermoplastic polymer layer, or by lamination of the liquid crystal polymer layer and the thermoplastic polymer layer mentioned above through the adhesive thermoplastic polymer layer.

As the adhesive thermoplastic polymer, there may be used a polymer having excellent adhesive properties relative to the liquid crystal polymer layer, when the adhesive polymer is molten or even after the adhesive polymer has cooled and solidified. As the adhesive thermoplastic polymer, there may be preferably used, for example, a modified polyolefin or a modified polyester. The liquid crystal polyester and a polyalkylene terephthalate above-mentioned are separate from the polyester used as the adhesive thermoplastic polymer.

A modified polyolefin being introduced a functional group is preferable. Examples of the functional group include carboxyl group, glycidyl group, an alkoxysilane group, hydroxyl group, an alkoxy group, an alkoxy carbonyl group, amino group and the like. The preferred functional group is carboxy group, the glycidyl group and the alkoxysilane group. A plurality of functional groups may be introduced, in combination, into olefin polymers. As examples of the modified polyolefin, there may be mentioned a carboxy modified polyolefin, a glycidyl modified polyolefin, an alkoxysilane modified polyolefin, a carboxy modified ethylene-ethyl acrylate copolymer, a glycidyl modified ethylene-ethyl acrylate copolymer, an alkoxysilane modified ethylene-ethyl acrylate copolymer, a carboxy modified ethylene-vinyl acetate copolymer, a glycidyl modified ethylene-vinyl acetate copolymer, an alkoxysilane modified ethylene-vinyl acetate copolymer or the like.

A carboxy modified, glycidyl modified, or alkoxysilane modified substance refers to a substance modified by an unsaturated carboxylic acid or an acid anhydride thereof such as acrylic acid, maleic anhydride or the like; a polymerizable unsaturated compound having glycidyl group such as glycidyl acrylate, glycidyl methacrylate or the like; or a polymerizable unsaturated compound having an alkoxysilane group such as methacryloxypropyltrimethoxysilane or the like.

The polyester having adhesive properties to the liquid crystal polymer layer is composed of polybasic acids and lower alkyl esters thereof, polyhydric alcohols, hydroxycarboxylic acids, and optionally a small amount of monobasic acids and a small amount of monohydric alcohols.

The polybasic acids include acids containing two or more carboxylic groups. As the polybasic acids, there may be mentioned, for example, aliphatic polybasic acids such as oxalic acid, maleic acid, maleic anhydride, succinic acid, adipic acid, pimelic acid, suberic acid, azelaic acid, sebacic acid, dodecanoic acid or the like; alicyclic polybasic acids such as 1,4-cyclohexanedicarboxylic acid or the like; and aromatic polybasic acids such as phthalic acid, phthalic anhydride, terephthalic acid, isophthalic acid, trimellitic acid, trimellitic anhydride, pyromellitic acid, pyromellitic anhydride, trimesic acid, naphthalene-2,6-dicarboxylic acid, diphenyl-4,4'-dicarboxylic acid, 3-sulphoisophthalic acid or the like. The polybasic acids may be used in combination. Among these polybasic acids, there is preferably used polybasic acid which mainly contains terephthalic acid in an amount of, for example, 30 to 80 mol % of all components of the polybasic acid and which contains adipic acid, sebacic acid and isophthalic acid as other components of the polybasic acid.

The polyhydric alcohols include alcohols having two or more hydroxyl groups. As examples of the alcohol, there may be mentioned aliphatic polyhydric alcohols such as ethylene glycol, diethylene glycol, triethylene glycol, polyethylene glycol, propylene glycol, dipropylene glycol, tripropylene glycol, polypropylene glycol, trimethylene glycol, 1,4-butanediol, 1,3-butanediol, 1,5-pentanediol, 1,6-hexanediol, neopentyl glycol, glycerol, trimethylol propane, pentaerythritol or the like; alicyclic polyhydric alcohols such as 1,4-cyclohexanedimethanol or the like; and aromatic polyhydric alcohols such as resorcinol, 2,2-bis (4-hydroxyphenyl) propane, 4,4'-bis (2-hydroxyethyl) phenyl-2,2-propane, 4,4'-bis(2-hydroxy-propyl) phenyl-2,2-propane, 4,4'-bis(2-hydroxy-ethoxyethyl) phenyl-2,2-propane, or the like. The polyhydric alcohols may be used in combination. Among these polyhydric alcohols, ethylene glycol and 1,4-butanediol are preferable, and 1,4-butanediol is more preferable.

Examples of hydroxycarboxylic acid include aliphatic hydroxycarboxylic acids such as glycolic acid, oxypropionic acid or the like; and aromatic hydroxycarboxylic acids such as hydroxybenzoic acid or the like. The hydroxycarboxylic acids may be used in combination.

It should be understood that the polyester abovementioned includes another polymers containing, as their segment components, the components of the adhesive thermoplastic polyester, e.g., polyester ethers, polyester amides, polyester carbonates and the like.

Among these adhesive thermoplastic polymers, polymers having heat-sealing properties (heat weldability) or hot-melt adhesive properties are preferable.

The adhesive thermoplastic polymers may be used either singly or in combination.

Figure 2:
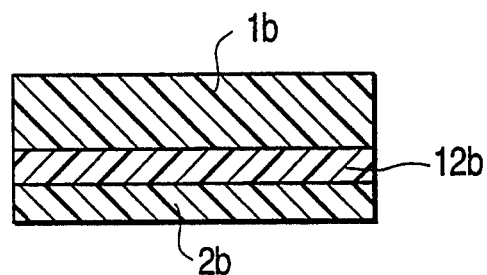
Figure 3:
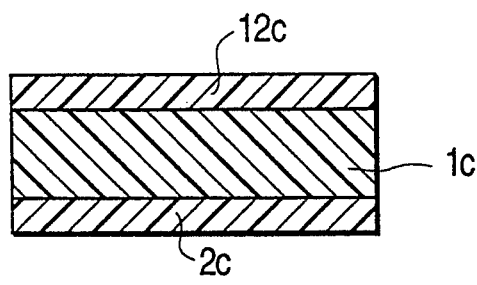
Figure 4:
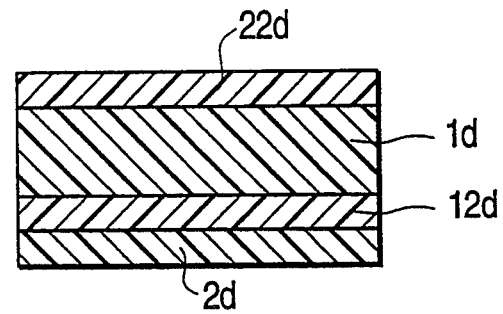
Figure 5:
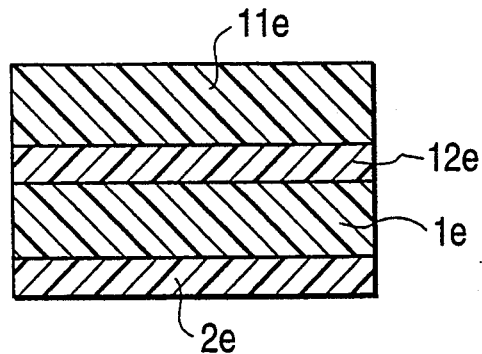

When the adhesive thermoplastic polymer is directly laminated on the liquid crystal polymer layer, a lamination structure of the composite film may be, for example, a two-layer structure, as shown in FIG. 1, in which a liquid crystal polymer layer 1a is laminated on an adhesive thermoplastic polymer layer 2a. The composite film may also have a structure, as shown in FIG. 2, in which a plurality of adhesive thermoplastic polymer layers 2b, 12b are laminated on one surface of a liquid crystal polymer layer 1b. The composite film may have a structure, as shown in FIG. 3, in which adhesive thermoplastic polymer layers 2c, 12c are laminated on both surfaces of a liquid crystal polymer layer 1c. The composite film may have a structure, as shown in FIG. 4, in which a plurality of adhesive thermoplastic polymer layers 2d, 12d are laminated on one surface of a liquid crystal polymer layer 1d and an adhesive thermoplastic polymer layer 22d is formed on the other surface of the liquid crystal polymer layer 1d. Furthermore, the composite film may also have a structure, as shown in FIG. 5, in which a plurality of liquid crystal polymer layers 1e, 11e and a plurality of adhesive thermoplastic polymer layers 2e, 12e are alternately laminated on one another.

According to the present invention, the lamination structure of the liquid crystal polymer layer and the adhesive thermoplastic polymer layer are not limited to the structures shown in FIG. 1 to FIG. 5. It is preferred that at least obverse or reverse layer of the composite film is composed of the adhesive thermoplastic polymer layer. In a composite film having such a lamination structure, portions of the adhesive thermoplastic polymer layer laminated on at least one surface of the film, may be readily and securely thermally bonded to each other. More specifically, when the adhesive thermoplastic polymer layer has heat-sealing properties, the composite film may pack an article by heating and pressing the composite film. Alternately, when the adhesive thermoplastic polymer layer has hot-melt adhesive properties with respect to, for example, a polymer material, a metallic material, glass and the like, the composite film may be laminated on an article to be bonded by heating and pressing the composite film.

The adhesive thermoplastic polymer layer may be formed throughout the liquid crystal polymer layer, or may be partially formed, for example, at the ends thereof to be thermally bonded.

The adhesive strengths of the adhesive thermoplastic polymer relative to the liquid crystal polymer layer and the thermoplastic polymer layer are greater than the adhesive mentioned above. Accordingly, with the use of the high adhesive properties of the adhesive thermoplastic polymer, composite films having a variety of lamination structures which the thermoplastic polymer layer is laminated on at least one surface of the liquid crystal polymer layer may be produced. On the liquid crystal polymer layer, a plurality of thermoplastic polymer layers of the same type or different types may be laminated with the use of the adhesive thermoplastic polymer layer.

When the polyalkylene terephthalate layer is laminated, the resultant composite film may be increased in oxygen gas barrier characteristics and heat resistance of the surface portion. When the olefin polymer layer is laminated, the composite film may be further increased in water vapor barrier properties with heat-sealing properties assured. Accordingly, the composite film may be readily made in the form of a sack by pillow-type packaging, four-way sealing or the like, and thus the composite film may be used in wide applications.

In the preferred composite film, a polyalkylene terephthalate layer is laminated on one surface of the liquid crystal polymer layer with the use of an adhesive thermoplastic polymer, and an olefin polymer layer is laminated on the other surface of the liquid crystal polymer layer with the use of an adhesive thermoplastic polymer. In the composite film having the lamination structure above-mentioned, the polyalkylene terephthalate layer may enhance the gas barrier characteristics as well as the heat resistance of the surface portion of the composite film, and the olefin type polymer layer may enhance the water vapor barrier properties and heat-sealing properties.

In another preferable composite film, polyalkylene terephthalate layers are respectively laminated on both surfaces of the liquid crystal polymer with the use of adhesive thermoplastic polymer layers. In the composite film having the lamination structure above-mentioned, the polyalkylene terephthalate layer may enhance the heat resistance of both obverse and reverse surfaces of the composite film. Accordingly, the composite film presents high resistance even at a high temperature of, for example, 180° C. Further, the polyaklylene terephthalate layers may further enhance the gas barrier characteristics. Accordingly, the composite film is excellent in gas barrier characteristics particularly at a high temperature. Further, since no olefin polymer layer is contained, the composite film produces no smell of polyolefin even at a high temperature.

The thermoplastic polymer layer, the adhesive layer and the adhesive thermoplastic polymer layer may contain the thermoplastic resin, a low-molecular organic compound, an inorganic substance above-mentioned. The adhesive thermoplastic polymer layer contains at least 50% by weight, preferably 75% by weight or more, of the modified polyolefin and/or polyester. The thickness of the thermoplastic polymer layer is not critical but may be usually about 0.5 to 50 $\mu$m. The thickness of the thermoplastic polymer layer is, for example, in a range of about 0.5 to 50 $\mu$m.

The composite film of the present invention may be produced by the following conventional methods.

(i) A dry-laminating method comprises the steps of preparing a liquid crystal polymer layer containing the liquid crystal polymer by a T-die method or an inflation method, and laminating the thermoplastic polymer layer on the resultant liquid crystal polymer layer by the adhesive;

(ii) a laminating method comprises laminating the adhesive thermoplastic polymer layer, and, if necessary, together with the thermoplastic polymer layer on the liquid crystal polymer layer obtained by the same procedure as in the above method (i), by heating and pressing with a heated roll and the like;

(iii) an extrusion-laminating method comprises the steps of melting and extruding the adhesive thermoplastic polymer and, if necessary, the thermoplastic polymer, and laminating the extruded layer(s) on the liquid crystal polymer layer;

(iv) a co-extrusion laminating method comprises, with use of a co-extrusion multi-layer molding machine provided with a T-die or an inflation die, co-extruding the liquid crystal polymer, the adhesive thermoplastic polymer and, if necessary, the thermoplastic polymer to laminate each layer; and (v) a combination of the method above-mentioned. At the time of laminating process of the above methods (i) to (iii), a film subjected to a surface treatment may be used. Examples of the surface treatment include corona discharge treatment, sputtering treatment, high frequency treatment, flame treatment, chromic acid treatment, solvent etching treatment, undercoat treatment, or a combination of the treatments above-mentioned.

Examples of the co-extrusion multi-layer molding machine include a multi-manifold die, a machine of the feed block type I in which a feed block and a single-layer die are combined, a machine of the feed block type II in which a feed block and a multi-manifold die are combined, a machine adapted to achieve co-extrusion molding in which polymers respectively form the layers of the multi-layer film are molded at different temperatures, such as VEIN DIE manufactured by Kuloren Co., Ltd. and the like. It is noted that the feed block is a co-extrusion multi-layer film manufacturing apparatus sold by Daw Co., Ltd., Eagan Co., Ltd., Kuloren Co., Ltd. and the like in USA.

As mentioned above, the liquid crystal polymer film generally has large mechanical anisotropic properties. The liquid crystal polymer film having small mechanical anisotropic properties may be prepared, for example, by the following inflation molding method which biaxially orientates the liquid crystal polymer molecules at the same time in the molding process. According to an inflation molding method with use of a molding machine provided with an inflation die, a molten liquid crystal polymer is extruded downwardly from an annular slit of the inflation die, and the extruded cylindrical film, so called bubble, is expanded and drawn. More specifically, the liquid crystal polymer not only is low in melt viscosity but also weak in the strength (stiffness) of the melted film. Therefore, when the melted liquid crystal polymer is extruded upwardly from the die, dead load acts on the melted film, and it is difficult to expand the cylindrical film stably. Thus, the mechanical anisotropic properties of the liquid crystal polymer film are not improved excessively. While, when the melted liquid crystal polymer is extruded downwardly from the die, the cylindrical film may be expanded with falling by the dead load and drawn smoothly. Thus, the cylindrical film may be stably and continuously expanded to give a film having small mechanical anisotropic properties.

The temperature for melting and extruding the liquid crystal polymer may be selected depending on a type of constituent units of the polymer, the ratio of the components and the like. Suitable melting and extruding temperature for the preferred liquid crystal polymer is selected, for example, in the range of about 180° to 360° C. Clearance of the annular slit, i.e. the lip clearance, is usually about 0.2 to 10 mm, preferably about 0.5 to 4 mm. The diameter of the annular slit is usually less than 200 mm, preferably less than 120 mm.

The cylindrical film extruded from the die is expanded to stretch in the TD direction, and is drafted with drawing to stretch in the MD direction.

The preferred temperature for expanding the cylindrical film is usually within the range from a temperature which is not lower than the second order transition point of the liquid crystal polymer to a temperature lower by about 10° to 100° C., particularly about 20° to 70° C. than the extrusion temperature.

The expansion of the cylindrical film is carried out according to a conventional manner in which external force is acted on the film from the inside to outside. For example, in such method, gas such as air, nitrogen, carbon dioxide and the like is charged from the inside of the inflation die. According to the gas charging method, the cylindrical film is expanded and stretched at a lower portion from the die where the temperature of the film is kinetically balanced with the pressure of the charged gas.

The stretching magnification in the TD direction, i.e. a blow ratio is in the range of about 1.5 to 10 times, preferably about 2 to 8 times, and more preferably about 2.5 to 6 times. If the stretching magnification in the TD direction is not more than 1.5 times, the mechanical anisotropic properties of the film increases. While the stretching magnification in the TD direction exceeds 10 time, in some case, the cylindrical film is led to blowout. The stretching magnification in the MD direction, i.e. a draft ratio is in the range of about 1.5 to 40 times, preferably about 2.5 to 30 times, and more preferably about 5 to 25 times. If the stretching magnification in the MD direction is not more than 1.5 times, it is difficult to expand stably the cylindrical film. While the stretching magnification in the MD direction exceeds 40 times, the polymer molecules orientate intensively in the MD direction to give a film having large mechanical anisotropic properties.

Further, a ratio of the stretching magnification in the TD direction and the stretching magnification in the MD direction influences significantly on the anisotropic properties of the film. When the stretching magnification in the TD direction is represented by Dtd, and the stretching magnification in the MD direction is represented by Dmd, the ratio of the stretching magnification in the TD direction and the stretching magnification in the MD direction is as follows:

0.1<Dtd/Dmd<2.5, preferably
0.25<Dtd/Dmd<2, and more preferably
0.4<Dtd/Dmd<1.5.

When the stretching is conducted in such conditions, the mechanical anisotropic properties of the resultant film is improved considerably to give a film having isotropic or near isotropic film.

The stretching magnification in the TD direction and the stretching magnification in the MD direction are represent by the following formula.

$Dtd = d/D$ $Dmd = v/V = s/S$ wherein d means an diameter of an annular slit of an inflation die, D means a diameter of a cylindrical film expanded in the form of bubble, V represents a linear velocity of a molten polymer delivered from the annular slit, v represents a drawing speed of the cylindrical film, s is an area of the annular slit, and S is a cross-section area of the film.

After stretching, the film is drawn by nip rolls under natural cooling or hot insulating conditions by use of a heat insulating mould. The temperature of the film passing between the nip rolls is in the range of about 50° to 170° C., preferably about 70° to 150° C.

The resultant film is optionally subjected to a heat treatment. The heat treatment may be carried out under a taut or non-taut condition. The heat treatment is conducted in a suitable atmosphere, e.g. air, nitrogen gas, or under vacuum, at a temperature of about 70° to 300° C. The hysteresis cycles of the heat treatment, heat treatment time, tension for the film and the like are determined depending on the type of the film, and the characteristics required for the film.

When, by a co-extrusion molding method, a composite film containing a liquid crystal polymer layer having small mechanical anisotropic properties is produced, there may be used a multi-layer molding machine. The machine provides an inflation die in which a plurality of passages are joined one to another are incorporated, and which the molten polymers can be extruded in a multi-layer. In the above method, the liquid crystal polymer and the adhesive thermoplastic polymer, and as necessary together with the thermoplastic polymer, are laminated in the die and extruded from the die. The resultant cylindrical film may be stretched in the TD direction and the MD direction in the same manner as mentioned above.

The composite film of the present invention may be uniaxially or biaxially stretched at a suitable magnification with stretching means of roll stretching, belt stretching, tenter stretching, tube stretching or the like.

When the liquid crystal polymer layer forms the surface layer of the composite film, the surface of the liquid crystal polymer layer may be subjected to plating treatment or the like.

INDUSTRIAL APPLICABILITY

The composite film of the present invention may be used as a film for packing a variety of articles in the form of piece-packaging, internal packaging, external packaging or sack packaging. For example, the composite film may be used as a food packaging material, a packaging material for oil cooking materials, a chemicals packaging material, a cosmetic goods packaging material, a fragrance holding packaging material for fragrant goods or the like. Further, with the use of the adhesive thermoplastic polymer layer, the composite film may be used as a protective film for protecting a desk, a test stand or the like. The composite film of the present invention is suitable for a food packaging material for retort foods, microwave-cooking foods or the like for which the gas barrier characteristics are required particularly at a high temperature. The following Examples and Comparative Examples illustrate the invention in further detail but are by no means limitative of the scope thereof.

EXAMPLES

Adhesive thermoplastic polymers used in Examples and Comparative Examples are respectively represented by the following marks.

A-1: A glycidyl modified ethylene-vinyl acetate copolymer (BONDFAST 7B manufactured by Sumitomo Chemical Co., Ltd.)

A-2: An alkoxysilane modified ethylene-ethyl acrylate copolymer (HPR AS252 manufactured by Dupont-Mitsui Polychemicals Co., Ltd.)

A-3: A glycidyl modified polyethylene (REXPEARL J-3700 manufactured by Nippon Petrochemical Co., Ltd.)

A-4: An olefin-type hot-melt adhesive film (CRANBETTER-H1730 manufactured by Kurabo Industries Ltd.)

A-5: A maleic anhydride modified ethylene-ethyl acrylate copolymer (HPR AR205 manufactured by Dupont-Mitsui Polychemicals Co., Ltd.)

A-6: A polyester (BYRON GM-900 manufactured by Toyobo Co., Ltd.)

A-7: A polyester (ARONMELT PES-140H manufactured by Toa Gosei Chemical Industry Co., Ltd.)

A-8: A polyester (KEMITT KF1132B manufactured by Toray Industries Inc.)

A-9: A polyester (KEMITT KF4132B manufactured by Toray Industries Inc.)

A-10: An maleic anhydride modified ethylene-ethyl acrylate copolymer (BONDINE TX8030 manufactured by Sumitomo Chemical Co., Ltd.)

A-11: An maleic anhydride modified polypropylene (MODIC P310K manufactured by Mitsubishi Petrochemical Co., Ltd.)

Polyalkylene terephthalates used in Examples are respectively represented by the following marks.

PBT : Polybutylene terephthalate (manufactured by Polyplastics Co., Ltd.; intrinsic viscosity of 1.0 dl/g as measured in orthochlorophenol at a temperature of 25° C.)

PET-G: Polyethylene terephthalate in which part of glycol components is being substituted with 1,4-cyclohexanedimethanol (PET-G6763 manufactured by Eastman Chemical Products Inc.)

PET : An oriented polyethylene terephthalate having a thickness of 12 $\mu$m and subjected to a corona discharge treatment (E5100 manufactured by Toyobo Co., Ltd.)

Olefin polymers used in Examples and Comparative Examples are respectively represented by the following marks.

PP-1: Polypropylene (NORBLEN FS2011D manufactured by Sumitomo Chemical Co., Ltd.)

PP-2: Polypropylene (NORBLEN FL7315G manufactured by Sumitomo Chemical Co., Ltd.)

MDPE : An intermediate-density polyethylene (NEOZEX 3510F manufactured by Mitsui Petrochemical Industries Ltd.)

EPCP : An ethylene-propylene copolymer (NORBLEN S131 manufactured by Sumitomo Chemical Co., Ltd.)

Other polymers used in Comparative Examples are respectively represented by the following marks.

EVAS : A saponified ethylene-vinyl acetate copolymer (KURALEN L6 manufactured by Sorbe Co., Ltd.)

EVA : An ethylene-vinyl acetate copolymer (EVA-FLEX P1905 manufactured by Dupont-Mitsui Polychemicals Co., Ltd.)

A liquid crystal polymer layer of a resultant composite film is represented by LCP.

EXAMPLE 1

Pellets of a liquid crystal polymer (VECTRA A900 manufactured by Polyplastics Co., Ltd.) composed of polyester (A) formed by the repeating units I and II mentioned earlier were molded into a film having a thickness of 40 $\mu$m with the use of a normal T-die molding machine. A surface of the liquid crystal polymer film was subjected to a corona discharge treatment. An adhesive thermoplastic polymer A-1 was laminated on the treated surface of the liquid crystal polymer film by an extrusion-laminating method to form a composite film having a lamination structure of LCP/A-1=40/15 ($\mu$m) as shown in FIG. 1.

EXAMPLE 2

A composite film having a lamination structure of LCP/A-2=40/15 ($\mu$m) was prepared in the same manner as in Example 1, except that an adhesive thermoplastic polymer A-2 was used instead of the adhesive thermoplastic polymer A-1 used Example 1.

EXAMPLE 3

A composite file having a lamination structure of LCP/A-3=40/15 ($\mu$m) was prepared in the same manner as in Example 1, except that an adhesive thermoplastic polymer A-3 was used instead of the adhesive thermoplastic polymer A-1 used in Example 1.

EXAMPLE 4

Pellets of a liquid crystal polymer used in Example 1 were molded into a film having a thickness of 40 $\mu$m with the use of a normal T-die molding machine. A surface of the liquid crystal polymer film was subjected to a corona discharge treatment. An adhesive thermoplastic polymer A-4 was laminated on the treated surface of the liquid crystal polymer film by heating and pressing with a heat roll. Thus, there was formed a composite film having a lamination structure of LCP/A-4=40/20 ($\mu$m).

EXAMPLE 5

Pellets of a liquid crystal polymer used in Example 1 were molded into a film having a thickness of 40 μm with the use of a normal T-die molding machine. A surface of the liquid crystal polymer film was subjected to a corona discharge treatment. An adhesive thermoplastic polymer A-5 and an adhesive thermoplastic polymer A-1 used in Example 1 were successively laminated on the treated surface of the liquid crystal polymer film by an extrusion-laminating method to form a composite film having a lamination structure of LCP/A-5/A-1=40/15/15 (μm) as shown in FIG. 2.

EXAMPLE 6

Pellets of a liquid crystal polymer used in Example 1 were molded into a film having a thickness of 40 μm with the use of a normal T-die molding machine. Both surfaces of the liquid crystal polymer film were subjected to a corona discharge treatment. An adhesive thermoplastic polymer A-1 used in Example 1 was laminated in two stages on both surfaces of the liquid crystal polymer film by an extrusion-laminating method to give a composite film having a lamination structure of A-1/LCP/A-1=15/40/15 (μm) as shown in FIG. 3.

EXAMPLE 7

Pellets of a liquid crystal polymer used in Example 1 were molded into a film having a thickness of 40 μm with the use of a normal T-die molding machine. Both surfaces of the liquid crystal polymer film were subjected to a corona discharge treatment. An adhesive thermoplastic polymer A-1 used in Example 1 and an adhesive thermoplastic polymer A-3 used in Example 3 were respectively laminated, in two stages, on both surfaces of the liquid crystal polymer film by an extrusion-laminating method. Thus, a composite film having a lamination structure of A-3/LCP/A-1=15/40/15 (μm) was obtained.

EXAMPLE 8

Pellets of a liquid crystal polymer used in Example 1 were molded into a film having a thickness of 40 μm with the use of a normal T-die molding machine. Both surfaces of the liquid crystal polymer film were subjected to a corona discharge treatment. An adhesive thermoplastic polymer A-1 used in Example 1 and an adhesive thermoplastic polymer A-5 used in Example 5 were laminated, in two stages, on one surface of the liquid crystal polymer film by an extrusion-laminating method to form a laminated film having a lamination structure of LCP/A-1/A-5=40/15/15 (μm). Then, an adhesive thermoplastic polymer A-2 used in Example 2 was laminated on the other surface of the liquid crystal polymer film by an extrusion-laminating method to prepare a composite film having a lamination structure of A-2/LCP/A-1/A-5=14/40/15/15 (μm).

EXAMPLE 9

A composite film having a lamination structure of LCP/A-3/=40/15 (μm) was prepared in the same manner as in Example 3. The LCP surface of the composite film was subjected to a corona discharge treatment. An adhesive thermoplastic polymer A-1 used in Example 1 and a liquid crystal polymer film used in Example 1 were laminated on the LCP treated surface of the composite film by a dry-laminating method. Thus, there was formed a composite film having a lamination structure of LCP/A-1/LCP/A-3=40/15/40/15 (μm).

COMPARATIVE EXAMPLES 1 AND 2

A test was conducted on the liquid crystal polymer film which had been obtained by Example 1 and not been subjected to treatment (Comparative Example 1), and the liquid crystal polymer film of which one surface had been subjected to a corona discharge treatment (Comparative Example 2).

A Nylon-6 film was thermally laminated on each of the adhesive thermoplastic polymer layers of the composite films of Examples and each of the liquid crystal polymer films of Comparative Examples. The adhesive strength of each film to Nylon-6 was measured as T-Peel Strength according to JIS K 6854. Together with the adhesive thermoplastic polymers to which the Nylon-6 films were thermally bonded, the results are shown in Table 1.

TABLE 1

| | Adhesive thermoplastic polymer layer | T-Peel strength (kgf/25 mm) |
|---|---|---|
| Example 1 | A-1 | 2.4 |
| Example 2 | A-2 | 1.2 |
| Example 3 | A-3 | 2.7 |
| Example 4 | A-4 | 1.8 |
| Example 5 | A-1 | 2.4 |
| Example 6 | A-1 | 2.4 |
| Example 7 | A-1 | 2.4 |
| Example 8 | A-5 | 2.5 |
| Example 9 | A-3 | 2.7 |
| Comparative Example 1 | LCP | 0.1 or less |
| Comparative Example 2 | LCP | 0.1 or less |

As apparent from Table 1, the composite films of Examples are considerably increased in bonding strength due to the presence of the adhesive thermoplastic polymer layers composed of the modified polyolefin, even though the liquid crystal polymer layers are used as elements. Furthermore, the modified polyolefin is securely bonded to the liquid crystal polymer films.

EXAMPLE 10

Pellets of a liquid crystals polymer used in Example 1 were molded into a film having a thickness of 40 μm with the use of a normal T-die molding machine. One surface of the liquid crystal polymer film was subjected to a corona discharge treatment. An adhesive thermoplastic polymer A-6 was laminated by an extrusion laminating method to give a composite film having a lamination structure of LCP/A-6=40/20 (μm).

EXAMPLE 11

A composite film having a lamination structure of LCP/A-6=40/20 (μm) was prepared in the same manner as in Example 10, except that an adhesive thermoplastic polymer A-7 was used instead of the adhesive thermoplastic polymer A-6 used in Example 10.

EXAMPLE 12

An adhesive thermoplastic polymer A-7 used in Example 11 was laminated, in two stages, on both surfaces of a liquid crystal polymer film in the same manner as in Example 10. Both surfaces of the liquid crystal polymer layer had been subjected to a corona discharge treatment. Thus, there was formed a composite film having a lamination structure of A-7/LCP/A-7=20/40/20 (μm) as shown in FIG. 2.

EXAMPLE 13

Pellets of a liquid crystal polymer used in Example 1 were molded into a film having a thickness of 40 μm with the use of a normal T-die molding machine. One surface of the liquid crystal polymer film was subjected to a corona discharge treatment. An adhesive thermoplastic polymer A-8 was laminated on the treated surface of the liquid crystal polymer film by heating and pressing with a heat roll to prepare a composite film having a lamination structure of LCP/A-8=40/30 (μm).

EXAMPLE 14

A composite film having a lamination structure of LCP/A-8=40/30 (μm) was prepared in the same manner as in Example 13, except that an adhesive thermoplastic polymer A-9 was used instead of polyester A-8 used in Example 13.

A polyethylene terephthalate film (Lumilar S10 having a thickness of 100 μm manufactured by Toray Co., Ltd.) was thermally laminated on each of the adhesive thermoplastic polymer layers of the composite films of Examples and each of the liquid crystal polymer films of Comparative Examples 1 and 2, under the conditions of a temperature of 220° C., a pressure of 5 kg/cm$^2$ and a pressing time of 1 minute. The adhesive strength of each film to the polyethylene terephthalate film was measured as T-Peel Strength according to JIS K 6854. Together with the adhesive thermoplastic polymer layers to which the polyethylene terephthalate layers were thermally bonded, the results are shown in Table 2.

TABLE 2

|  | Adhesive thermoplastic polymer layer | T-Peel strength (kgf/25 mm) |
|---|---|---|
| Example 10 | A-6 | 1.3 |
| Example 11 | A-7 | 1.4 |
| Example 12 | A-7 | 1.4 |
| Example 13 | A-8 | 1.5 |
| Example 14 | A-9 | 1.4 |
| Comparative Example 1 | LCP | Not bonded |
| Comparative Example 2 | LCP | Not bonded |

As can be seen from Table 2, the composite films of Examples were considerably increased in bonding strength due to the adhesive thermoplastic polymer layers composed of polyester, and the polyester is securely bonded to the liquid crystal polymer films.

EXAMPLE 15

Polyalkylene terephthalate PBT, an adhesive thermoplastic polymer A-1, a liquid crystal polymer used in Example 1, an adhesive thermoplastic polymer A-10 and an olefin polymer PP-1 were fed to a multi-layer molding apparatus of the feed block type. These polymers were co-extruded and molded into a six-layer structure to prepare a composite film having a lamination structure of PBT/A-1/LCP/A-1/A-10/PP-1 =20/10/30/10/10/20 (μm).

EXAMPLE 16

Polyalkylene terephthalate PBT, an adhesive thermoplastic polymer A-10, an adhesive thermoplastic polymer A-3, a liquid crystal polymer used in Example 1 and an olefin polymer MDPE were co-extruded and molded into a six-layer structure in the same manner as in Example 15. Thus, there was obtained a composite film having a lamination structure of PBT/A-10/A-3/LCP/A-3/MDPE=20/10/10/30/10/20 (μm).

EXAMPLE 17

Polyalkylene terephthalate PBT, an adhesive thermoplastic polymer A-2, a liquid crystal polymer used in Example 1, an adhesive thermoplastic polymer A-10 and an olefin polymer EPCP were co-extruded and molded into a six-layer structure in the same manner as in Example 15. Thus, there was formed a composite film having a lamination structure of PBT/A-2/LCP/A-2/A-10/EPCP=20/10/30/10/10/20 (μm).

EXAMPLE 18

A composite film having a lamination structure of PETG/A-1/LCP/A-1/A-10/EPCP=20/10/30/10/10/20 (μm) was obtained in the same manner as in Example 15 except that polyalkylene terephthalate PET-G and an olefin polymer EPCP were used instead of polyalkylene terephthalate PBT and the olefin polymer PP-1 used in Example 15.

EXAMPLE 19

An adhesive thermoplastic polymer A-10, an adhesive thermoplastic polymer A-3, a liquid crystal polymer used in Example 1 and an olefin polymer MDPE were co-extruded and molded into a six-layer structure in the same manner as in Example 15. Thus, there was formed a multi-layer film having a lamination structure of A-10/A-3/LCP/A-3/A-10/MDPE=10/10/30/10/10/20 (μm).

Then, polyalkylene terephthalate PET was thermally laminated on the A-10 layer of the multi-layer film above-mentioned to prepare a composite film having a lamination structure of PET/A-10/A-3/LCP/A-3/A-10/MDPE=12/10/10/30/10/10/20 (μm).

COMPARATIVE EXAMPLE 3

An olefin polymer PP-2, an adhesive thermoplastic polymer A-11 and a saponified ethylene-vinyl acetate copolymer EVAS were co-extruded and molded into a five-layer structure in the same manner as in Example 15, thus forming a composite film having a lamination structure of PP-2/A-11/EVAS/A-11/PP-2=25/10/30/10/25 (μm).

COMPARATIVE EXAMPLE 4

In the same manner as in example 15, there were co-extruded and molded, into a five-layer structure, (i) an olefin polymer PP-2 used in Comparative Example 3, (ii) an ethylene-vinyl acetate copolymer EVA and (iii) a resin composition PVDC containing 5 parts by weight of epoxy resin, 5 parts by weight of butyl sebatate as a plasticizer and 0.3 parts by weight of stearic acid as a lubricant, each for 100 parts by weight of a polyvinylidene chloride copolymer (composed of not less than 90% by weight of polyvinylidene chloride and not more than 10% by weight of methyl acrylate). Thus, there was formed a composite film having a lamination structure of PP-2/EVA/PVDC/EVA/PP-2=25/10/30/10/25 (μm).

In the following manners, tests were conducted on each of the composite films of Examples and Comparative Examples to measure its oxygen gas permeability, vapor permeability and oxygen gas permeability after a treatment of retort sterilization.

Oxygen Gas Permeability:

With the use of carrier gas containing 98% of nitrogen gas and 2% of hydrogen gas, the oxygen gas permeability was measured under the conditions of a temperature of 23° C. and a relative humidity of 60% by an isotactic method according to ASTM D-3985-81.

Vapor Permeability:

With the use of air as carrier gas, the vapor permeability was measured under the conditions of a temperature of 25° C. and a relative humidity of 90% with an infrared-ray sensor according to ASTM F-372-73.

Oxygen Gas Permeability after Treatment of Retort Sterilization:

After each film had been immersed in a pressurized hot water of a temperature of 120° C. for 30 minutes, the oxygen gas permeability after retort sterilization was measured under the conditions of a temperature of 20° C. and a relative humidity of 40% according to the method of measuring the oxygen gas permeability above-mentioned.

The results are shown in Table 3.

TABLE 3

|  | Example | | | | | Comparative Example | |
|---|---|---|---|---|---|---|---|
|  | 15 | 16 | 17 | 18 | 19 | 3 | 4 |
| The thickness of the film ($\mu$m) | 100 | 100 | 100 | 100 | 102 | 100 | 100 |
| Oxygen Gas Permeability (cc/m$^2$ · 24 hours) | 0.80 | 0.83 | 0.79 | 0.81 | 0.72 | 3.0 | 2.3 |
| Vapor Permeability (g/m$^2$ · 24 hours) | 0.62 | 0.64 | 0.57 | 0.61 | 0.58 | 18.0 | 3.0 |
| Oxygen Gas Permeability after Retort Treatment (g/m$^2$ · 24 hours) | 0.80 | 0.84 | 0.80 | 0.83 | 0.74 | 97.0 | 9.0 |

From Table 3, it is seen that the composite films of Examples 15 to 19 are superior in oxygen gas and moisture barrier characteristics to the composite films of Comparative Examples 3 and 4. The composite film of Comparative Example 3 is considerably decreased in gas barrier characteristics after the treatment of retort sterilization, while the composite films of Examples 15 to 19 are hardly decreased in gas barrier characteristics even after the treatment of retort sterilization.

EXAMPLE 20

In the same manner as in Example 15, polyalkylene terephthalate PBT, an adhesive thermoplastic polymer A-1 and a liquid crystal polymer used in Example 1 were fed to a multi-layer molding machine of the feed block type. These polymers were co-extruded and molded into a five-layer structure to give a composite film having a lamination structure of PBT/A-1/LCP/A-1/PBT=25/10/30/10/25 ($\mu$m).

EXAMPLE 21

In the same manner as in Example 15, polyalkylene terephthalate PBT, an adhesive thermoplastic polymer A-10, an adhesive thermoplastic polymer A-3 and a liquid crystal polymer used in Example 1 were co-extruded and molded into a seven-layer structure to form a composite film having a lamination structure of PBT/A-10/A-3/LCP/A-3/A-10/PBT=20/10/10/30/10/10/20 ($\mu$m).

EXAMPLE 22

In the same manner as in Example 15, polyalkylene terephthalate PBT, an adhesive thermoplastic polymer A-2 and a liquid crystal polymer used in Example 1 were co-extruded and molded into a five-layer structure to form a composite film having a lamination structure of PBT/A-2/LCP/A-2/PBT=25/10/30/10/25 ($\mu$m).

EXAMPLE 23

A composite film having a lamination structure of PET-G/A-1/LCP/A-1/PET-G=25/10/30/10/25 ($\mu$m) was formed after co-extruded and molded in a five-layer structure in the same manner as in example 20, except that polyalkylene terephthalate PET-G was used instead of polyalkylene terephthalate PBT used in Example 20.

EXAMPLE 24

In the same manner as in Example 15, an adhesive thermoplastic polymer A-10, an adhesive thermoplastic polymer A-3 and a liquid crystal polymer used in Example 1 were co-extruded and molded into a five-layer structure to form a multi-layer film having a structure of A-10/A-3/LCP/A-3/A-10=10/10/30/10/10 ($\mu$m).

Then, polyaklylene terephthalate PET was thermally laminated on both outer A-10 layers of the multi-layer film by heating and pressing with a heat roll to prepare a composite film having a structure of PET/A-10/A-3/LCP/A-3/A-10/PET=12/10/10/30/10/10/12 ($\mu$m).

Under the same conditions as those mentioned earlier, tests were conducted on each of the composite films of Examples and Comparative Examples to measure its oxygen gas permeability, vapor permeability and oxygen gas permeability after treatment of retort sterilization. Further, tests were conducted to check the composite films for smell and fragrance preservation in the following manner.

Smell:

Each film was impulse-sealed at four sides thereof to form a sac having vapor removing holes. Each sac into which water had been poured, was heated for 5 minutes in a microwave oven. The presence or absence of a polyolefin smell was evaluated by an organoleptic test.

P Fragrance Preservation:

From each film, there was formed a sac of 100 mm×100 mm for containing 5 ml of methyl salicylate, of which each side was sealed at two portions, each for a sealing width of 15 mm, at predetermined spatial intervals with the use of an impulse sealer to prevent the leakage from the sealed portions. The sacs were left for 30 days under an atmosphere of a temperature of 40° C. and a relative humidity of 90%. The weight loss rates of the sacs were then measured.

The results are shown in Table 4.

TABLE 4

|  | Example | | | | | Comparative Example | |
|---|---|---|---|---|---|---|---|
|  | 20 | 21 | 22 | 23 | 24 | 3 | 4 |
| The thickness of the film ($\mu$m) | 100 | 110 | 100 | 100 | 94 | 100 | 100 |
| Smell | Non | Non | Non | Non | Non | Yes | Yes |
| Fragrance Preservation | 0.1> | 0.1> | 0.1> | 0.1> | 0.1> | 0.3 | 0.5 |

TABLE 4-continued

|  | Example | | | | | Comparative Example | |
|---|---|---|---|---|---|---|---|
|  | 20 | 21 | 22 | 23 | 24 | 3 | 4 |
| (weight %) | | | | | | | |
| Oxygen Gas Permeability (cc/m² · 24 hours) | 0.75 | 0.77 | 0.71 | 0.73 | 0.70 | 3.0 | 2.3 |
| Vapor Permeability (g/m² · 24 hours) | 0.65 | 0.68 | 0.63 | 0.65 | 0.63 | 18.0 | 3.0 |
| Oxygen Gas Permeability after Retort Treatment (g/m² · 24 hours) | 0.75 | 0.78 | 0.73 | 0.74 | 0.71 | 97.0 | 9.0 |

As apparent from Table 4, the composite films of Examples, even when heated produce no small of polyolefin. On the contrary, the composite films of Comparative Examples 3 and 4 produce a smell of polyolefin. The decrease in weight of methyl salicylate in each of the composite films of Examples are less than 0.1% by weight, thus, the composite films of Examples are excellent in fragrance preservation. The composite films of Examples are also excellent in oxygen gas and moisture barrier characteristics. In the composite films of Examples, the gas barrier characteristics are substantially not decreased even after the treatment of retort sterilization.

EXAMPLE 25

Under the following conditions, a liquid crystal polymer used in the Example 1 was extruded and molded into a film having a thickness of 40 μm with the use of a extrusion machine provided with an inflation die.

| Extrusion direction: | downward |
|---|---|
| Temperature of extrusion: | 290° C. |
| Lip clearance: | 1.0 mm |
| Blow ratio Dtd: | 5.0 |
| Draft ratio Dmd: | 5.0 |
| Dtd/Dmd: | 1.00 |

The resultant film had the following mechanical characteristics:

Tensile elastic modulus in the MD direction:

$14 \times 10^4$ kgf/cm²

Tensile elastic modulus in the TD direction:

$11 \times 10^4$ kgf/cm²

Tensile strength in the MD direction:

$3.7 \times 10^3$ kgf/cm²

Tensile strength in the TD direction:

$3.2 \times 10^3$ kgf/cm²

One surface of the film was subjected to a corona discharge treatment, an adhesive thermoplastic polymer A-1 was laminated on the treated surface of the film by a extrusion laminating method to obtain a composite film having a lamination structure of LCP/A-1=40/15 (μm) as shown in FIG. 1.

According to the same test method as in Examples ]. to 9, a nylon 6 film was thermally laminated on the A-1 layer of the resultant film to measure the adhesive strength of the A-1 layer to the nylon 6 film. The adhesive strength was 2.7 kgf/25 mm.

EXAMPLE 26

A composite film having a lamination structure of LCP/A-3=40/15 (μm) was obtained in the same manner as in Example 25, except that an adhesive thermoplastic polymer A-3 was used instead of the adhesive thermoplastic polymer A-1 used in Example 25.

In the same manner as in Example 25, the adhesive strength of the A-3 layer of the resultant composite film to the nylon 6 film was measured, and the adhesive strength was 2.9 kgf/25 mm.

EXAMPLE 27

A liquid crystal polymer film having a thickness of 40 μm was formed in the same manner as in Example 25, and one surface of the film was subjected to a corona discharge treatment. An adhesive thermoplastic polymer A-4 was laminated on the treated surface of the liquid crystal polymer film by heating and pressing with use of a heated roll to give a composite film having a lamination structure of LCP/A-4=40/20 (μm).

As a result of measuring the adhesive strength of the A-4 layer of the resultant composite film to the nylon 6 film in the same manner as in Example 25, the adhesive strength was 2.1 kgf/25 mm.

EXAMPLE 28

Under the following conditions, a liquid crystal polymer used in the Example 1 was extruded and molded into a film having a thickness of 30 μm with the use of a extrusion machine provided with an inflation die.

| Extrusion direction: | downward |
|---|---|
| Temperature of extrusion: | 290° C. |
| Lip clearance: | 1.0 mm |
| Blow ratio Dtd: | 5.5 |
| Draft ratio Dmd: | 6.0 |
| Dtd/Dmd: | 0.92 |

The resultant film had the following mechanical characteristics:

Tensile elastic modulus in the MD direction:

$14 \times 10^4$ kgf/cm²

Tensile elastic modulus in the TD direction:

$12 \times 10^4$ kgf/cm²

Tensile strength in the MD direction:

$3.7 \times 10^3$ kgf/cm²

Tensile strength in the TD direction:

$3.4 \times 10^3$ kgf/cm²

Both surfaces of the resultant liquid crystal polymer film were subjected to a corona discharge treatment. Polyalkylene terephthalate PBT and an adhesive thermoplastic polymer A-1 were co-extruded and molded with the use of a co-extrusion molding machine provided with a T-die to prepare a film having a lamination structure of PBT/A-1=20/10 (μm). Further, an olefin polymer PP-1 and the adhesive thermoplastic polymer A-1 were co-extruded and molded with the use of a co-extrusion molding machine provided with a T-die to prepare a film having a lamination structure of PP-1/A-1=20/10 (μm). Then, the A-1 layer of the film having the lamination structure of PBT/A-1 was laminated on one surface of the liquid crystal polymer film, and the A-1 layer of the film having a lamination structure of PP-1/A-1 was laminated on the other surface of the liquid crystal polymer film by heating and pressing with a heated roll, respectively, to give a composite film having a lamination structure of PBT/A-1/LC2/A-1/PP-1=20/10/30/10/20 (μm).

The resultant composite film had an oxygen gas permeability of 0.70 cc/m$^2$·24 hours, a vapor permeability of 0.62 g/m$^2$·24 hours, and a oxygen gas permeability after retort treatment of 0.71 cc/m$^2$·24 hours.

EXAMPLE 29

Polyalkylene terephthalate PBT and an adhesive thermoplastic polymer A-3 were co-extruded and molded into a film having a lamination structure of PBT/A-3=20/10 (μm) with use of a co-extrusion molding machine provided with a T-die. Further, an olefin polymer MDPE and the adhesive thermoplastic polymer A-3 were co-extruded and molded with a co-extrusion molding machine provided with a T-die to prepare a film having a lamination structure of MDPE/A-3=20/10(μm). Then, the A-3 layer of the film having the lamination structure of PBT/A-3 was laminated on one surface of the liquid crystal polymer film which had been obtained in Example 28 and both surfaces thereof had been subjected to a corona discharge treatment, and the A-3 layer of the film having a lamination structure of MDPE/A-3 was laminated on the other surface of the liquid crystal polymer film by heating and pressing with a heated roll, respectively, to give a composite film having a lamination structure of PBT/A-3/LCP/A-3/MDPE=20/10/30/10/20 (μm).

The resultant composite film had an oxygen gas permeability of 0.72 cc/m$^2$·24 hours, a vapor permeability of 0.65 g/m$^2$·24 hours, and a oxygen gas permeability after retort treatment of 0.74 cc/m$^2$·24 hours.

EXAMPLE 30

Under the following conditions, a liquid crystal polymer used in the Example 1 was extruded and molded with a extrusion machine provided with an inflation die to give a film having a thickness of 33 μm.

| Extrusion direction: | downward |
|---|---|
| Temperature of extrusion: | 290° C. |
| Lip clearance: | 1.0 mm |
| Blow ratio Dtd: | 6.0 |
| Draft ratio Dmd: | 5.0 |
| Dtd/Dmd: | 1.2 |

The resultant film had the following mechanical characteristics:

Tensile elastic modulus in the MD direction:

$13 \times 10^4$ kgf/cm$^2$

Tensile elastic modulus in the TD direction:

$14 \times 10^4$ kgf/cm$^2$

Tensile strength in the MD direction:

$3.4 \times 10^3$ kgf/cm$^2$

Tensile strength in the TD direction:

$3.6 \times 10^3$ kgf/cm$^2$

Both surfaces of the resultant liquid crystal polymer film were subjected to a corona discharge treatment, and a composite film having a lamination structure of PBT/A-1/LCP/A-1/PP-1=20/10/33/10/20 (μm) was obtained in the same manner as in Example 28.

The resultant composite film had an oxygen gas permeability of 0.68 cc/m$^2$·24 hours, a vapor permeability of 0.60 g/m$^2$·24 hours, and a oxygen gas permeability after retort treatment of 0.68 cc/m$^2$·24 hours.

EXAMPLE 31

Pellets of a liquid crystal polymer used in Example 1 were molded into a film having a thickness of 30 μm in the same manner as in Example 28. Both surfaces of the resultant liquid crystal polymer film were subjected to a corona discharge treatment. In the same manner as in Example 28, a film havig a lamination structure of PBT/A-1=20/10 (μm) was prepared by use of polyalkylene terephthalate PBT and an adhesive thermoplastic polymer A-1.

Then, on each surface of the liquid crystal polymer film was laminated the A-1 layer of the films having the lamination structure of PBT/A-1, respectively, to give a composite film having a lamination structure of PBT/A-1/LCP/A-1/PBT=20/10/30/10/20 (μm).

The resultant composite film had an oxygen gas permeability of 0.68 cc/m$^2$·24 hours, a vapor permeability of 0.60 g/m$^2$·24 hours, and a oxygen gas permeability after retort treatment of 0.68 cc/m$^2$·24 hours.

EXAMPLE 32

Pellets of a liquid crystal polymer used in Example 1 were molded into a film having a thickness of 30 μm in the same manner as in Example 28. Both surfaces of the resultant liquid crystal polymer film were subjected to a corona discharge treatment. Polyalkylene terephthalate PBT and an adhesive thermoplastic polymer A-7 were co-extruded and molded with a co-extrusion molding machine provided with a T-die to prepare a film having a lamination structure of PBT/A-7=20/10 (μm). Further, an olefin polymer PP-1 and an adhesive thermoplastic polymer A-1 were co-extruded and molded with use of a co-extrusion molding machine to prepare a film having a lamination structure of PP-1/A-1=20/10 (μm).

Then, in the same manner as in Example 28, the A-7 layer of the film having the lamination structure of PBT/A-7 was laminated on one surface of the liquid crystal polymer film, and the A-1 layer of the film having the lamination structure of PP-1/A-1 was laminated on the other surface of the liquid crystal polymer film to give a composite film having a lamination structure of PBT/A-V/LCP/A-1/PP-1=20/10/30/10/20 (μm).

The obtained composite film had an oxygen gas permeability of 0.71 cc/m$^2$·24 hours, a vapor permeability of 0.62 g/m$^2$·24 hours, and a oxygen gas permeability after retort treatment of 0.71 cc/m$^2$·24 hours.

EXAMPLE 33

A polycarbonate (YOUPILON S-3000 manufactured by Mitsubishi Gas Chemical Company, Inc., hereinafter referred to as PC) and an adhesive thermoplastic polymer A-1 were co-extruded and molded with a co-extrusion molding machine provided with a T-die to form a film having a lamination structure of PC/A-1=20/10 (μm).

In the same manner as in Example 28, a composite film having a lamination structure of PC/A-1/LCP/A-1/PP-1=20/10/30/10/20 (μm) was obtained, except that the film having the lamination structure of PC/A-1 was used instead of the film of Example 28 having the lamination structure of PBT/A-1.

The obtained composite film had an oxygen gas permeability of 0.73 cc/m$^2$·24 hours, a vapor permeability of 0.66 g/m$^2$·24 hours, and a oxygen gas permeability after retort treatment of 0.74 cc/m$^2$·24 hours.

EXAMPLE 34

Nylon 6 (UBENYLON 1022B manufactured by Ube Industries, Ltd., hereinafter referred to as NY) and an adhesive thermoplastic polymer A-3 were co-extruded and molded with a co-extrusion molding machine provided with a T-die to form a film having a lamination structure of NY/A-3=20/10 (μm).

In the same manner as in Example 28, a composite film having a lamination structure of NY/A-3/LCP/A-1/PP-1=20/10/30/10/20 (μm) was obtained, except that the film having the lamination structure of NY/A-3 was used instead of the film of Example 28 having the lamination structure of PBT/A-1.

The composite film had an oxygen gas permeability of 0.70 cc/m$^2$·24 hours, a vapor permeability of 0.60 g/m$^2$·24 hours, and a oxygen gas permeability after retort treatment of 0.73 cc/m$^2$·24 hours.

EXAMPLE 35

Under the same conditions as in Example 28, pellets of a liquid crystal polymer used in Example 1 and an adhesive thermoplastic polymer A-1 were co-extruded and molded, with the use of a extrusion molding machine provided with an inflation die being capable of molding polymers into a two-layer structure, into a composite film having a lamination structure of LCP/A-1=20/10 (μm). The resultant composite film had the following mechanical characteristics:

Tensile elastic modulus in the MD direction:

$9.8 \times 10^4$ kgf/cm$^2$

Tensile elastic modulus in the TD direction:

$8.4 \times 10^4$ kgf/cm$^2$

Tensile strength in the MD direction:

$2.6 \times 10^3$ kgf/cm$^2$

Tensile strength in the TD direction:

$2.4 \times 10^3$ kgf/cm$^2$

The composite film had an oxygen gas permeability of 1.02 cc/m$^2$·24 hours, a vapor permeability of 0.88 g/m$^2$·24 hours, and a oxygen gas permeability after retort treatment of 1.05 cc/m$^2$·24 hours.

EXAMPLE 36

Under the same conditions as in Example 28, pellets of a liquid crystal polymer used in Example 1, an adhesive thermoplastic polymer A-1, and polyalkylene terephthalate PBT were co-extruded and molded, with the use of a extrusion molding machine provided with an inflation die being capable of molding polymers into a three-layer structure, into a composite film having a lamination structure of LCP/A-1/PBT=10/10/10 (μm). Even though the thickness of the LCP layer was 10 μm, the resultant composite film had the following mechanical characteristics:

Tensile elastic modulus in the MD direction:

$5.6 \times 10^4$ kgf/cm$^2$

Tensile elastic modulus in the TD direction:

$4.8 \times 10^4$ kgf/cm$^2$

Tensile strength in the MD direction:

$1.5 \times 10^3$ kgf/cm$^2$

Tensile strength in the TD direction:

$1.4 \times 10^3$ kgf/cm$^2$

The composite film had an oxygen gas permeability of 2.00 cc/m$^2$·24 hours, a vapor permeability of 1.23 g/m$^2$·24 hours, and a oxygen gas permeability after retort treatment of 2.05 cc/m$^2$·24 hours.

EXAMPLE 37

Under the same conditions as in Example 36, pellets of a liquid crystal polymer used in Example 1, an adhesive thermoplastic polymer A-1, and a polycarbonate PC were co-extruded and molded to give a composite film having a lamination structure of LCP/A-1/PC=10/10/10 (μm). Even though the thickness of the LCP layer was 10 μm, the resultant composite film had the following mechanical characteristics:

Tensile elastic modulus in the MD direction:

$5.7 \times 10^4$ kgf/cm$^2$

Tensile elastic modulus in the TD direction:

$4.7 \times 10^4$ kgf/cm$^2$

Tensile strength in the MD direction:

$1.5 \times 10^3$ kgf/cm$^2$

Tensile strength in the TD direction:

$1.3 \times 10^3$ kgf/cm$^2$

The composite film had an oxygen gas permeability of 2.08 cc/m$^2$·24 hours, a vapor permeability of 1.28 g/m$^2$·24 hours, and a oxygen gas permeability after retort treatment of 2.13 cc/m$^2$·24 hours.

EXAMPLE 38

Pellets of a liquid crystal polymer used in Example 1 were molded into a film having a thickness of 40 μm with the use of a normal T-die molding machine. One surface of the liquid crystal polymer film was subjected to a corona discharge treatment. A two-component type curable urethane adhesive (3M-8101 manufactured by Sumitomo 3M Limited) was applied to the treated surface of the liquid crystal polymer film in an amount of 5 g/m$^2$ (on the dried bases), and an biaxially stretched polypropylene film having a thickness of 20 μm (Daicel Chemical Industries Co., Ltd.) was laminated on the coated adhesive layer by a dry-laminating method to give a composite film.

The resultant composite film had an oxygen gas permeability of 0.55 cc/m$^2$·24 hours, a vapor permeability of 0.48 g/m²·24 hours, and a oxygen gas permeability after retort treatment of 0.58 cc/m²·24 hours.

EXAMPLE 39

In the same manner as in Example 38, a composite film was obtained except that polyalkylene terephthalate PET was used instead of the biaxially stretched polypropylene film of Example 38.

The composite film had an oxygen gas permeability of 0.53 cc/m²·24 hours, a vapor permeability of 0.46 g/m²·24 hours, and a oxygen gas permeability after retort treatment of 0.55 cc/m²·24 hours.

EXAMPLE 40

In the same manner as in Example 38, a composite film was obtained except that an biaxially stretched nylon 6 film (EMBLEM manufactured by Unitika Ltd.) was used instead of the biaxially stretched polypropylene film of Example 38.

The resultant composite film had an oxygen gas permeability of 0.51 cc/m²·24 hours, a vapor permeability of 0.48 g/m²·24 hours, and a oxygen gas permeability after retort treatment of 0.54 cc/m²·24 hours.

We claim:

1. A composite film comprising, a thermotropic liquid crystal polymer layer, and an adhesive thermoplastic polymer layer laminated on at least one surface of said liquid crystal polymer layer,
   said adhesive thermoplastic layer having adhesive properties relative to said liquid crystal polymer layer and heat sealing properties or hot-melt adhesive properties and
   said adhesive thermoplastic polymer layer comprising an adhesive thermoplastic polymer selected from a modified polyolefin having at least one functional group selected from the group consisting of carboxyl group, glycidyl group, and an alkoxysilane group.

2. A composite film according to claim 1, wherein the thermotropic liquid crystal polymer is at least one polymer selected from the group consisting of a polyester, a polythiol ester, a polyester amide, a polyazomethine and a polyester-carbonate.

3. A composite film according to claim 1, wherein the thermotropic liquid crystal polymer is a fully aromatic polyester.

4. A composite film according to claim 3, wherein the weight-average molecular weight of the fully aromatic polyester is in a range from 2,000 to 200,000.

5. A composite film according to claim 1, wherein the thermotropic liquid crystal polymer is a fully aromatic polyester amide.

6. A composite film according to claim 5, wherein the weight-average molecular weight of the fully aromatic polyester amide is in a range from 5,000 to 50,000.

7. A composite film according to claim 1, wherein the thermotropic liquid crystal polymer is a polyester substantially containing 10 to 90 mol % of the following repeating unit I and 10 to 90 mol % of the following repeating unit II:

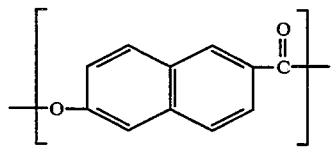

I

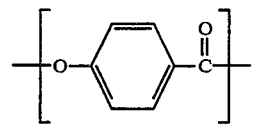

II

8. A composite film according to claim 1, wherein the thermal deformation temperature of the thermotropic liquid crystal polymer is in a range from 120° to 350° C.

9. A composite film according to claim 8, wherein the thermal deformation temperature of the thermotropic liquid crystal polymer is in a range from 150° to 250° C.

10. A composite film according to claim 1, wherein the elastic modulus of the thermotropic liquid crystal polymer is in a range from $6 \times 10^4$ to $2.5 \times 10^5$ kgf/cm².

11. A composite film according to claim 1, wherein the tensile strength of the thermotropic liquid crystal polymer is in a range from 1,000 to 3,000 kgf/cm².

12. A composite film according to claim 1, wherein the thermotropic liquid crystal polymer has a vapor permeability of 8 g/m²·25 μm·24 hours·atm or less.

13. A composite film according to claim 1, wherein in the thermotropic liquid crystal polymer has a oxygen/carbon dioxide gas permeability of 10 cc/m²·25 μm·24 hours·atm or less.

14. A composite film according to claim 1, wherein the thermotropic liquid crystal polymer presents dimensional variations from 0.003 to 0.02% at a temperature of 70° C. and at a relative humidity of 96%.

15. A composite film according to claim 1, wherein the liquid crystal polymer layer has the following characteristics:
   (a) tensile elastic modulus in the longitudinal direction: $6 \times 10^4$ kgf/cm² or more,
   (b) tensile elastic modulus in the cross direction: 0.5 to 1.5 times of the tensile elastic modulus in the longitudinal direction,
   (c) tensile strength in the longitudinal direction: $3 \times 10^3$ kgf/cm² or more, and
   (d) tensile strength in the cross direction: 0.5 times or more of the tensile strength in the longitudinal direction.

16. A composite film according to claim 1, wherein the liquid crystal polymer layer has the following thermal expansion characteristics:
   thermal expansion coefficient in the longitudinal direction: $-1 \times 10^{-5}$ to $+1 \times 10^{-5}/°$ C., and
   thermal expansion coefficient in the cross direction: $-1 \times 10^{-5}$ to $+2 \times 10^{-5}/°$ C.

17. A composite film according to claim wherein in the liquid crystal polymer layer contains 75% by weight or more or a thermotropic liquid crystal polymer.

18. A composite film according to claim 1, wherein the thermoplastic polymer layer is further laminated on at least one surface of the liquid crystal polymer layer through the adhesive thermoplastic polymer layer.

19. A composite film according to claim 18, wherein the thermoplastic player layer is a polyalkylene terephthalate layer, an olefin polymer layer, a nylon later or a polycarbonate layer.

20. A composite film according to claim 19, wherein the polyalkylene terephthalate is polyethylene terephthalate, a polyethylene terephthalate in which part of ethylene glycol is being substituted with 1,4-cyclohexanedimethanol or diethylene glycol, or polybutylene terephthalate.

21. A composite film according to claim 19, wherein the olefin polymer is polyethylene, polypropylene or an ethylene-propylene copolymer.

22. A composite film according to claim 18, wherein the polyalkylene terephthalate layer is laminated on one surface of the liquid crystal polymer layer through the adhesive thermoplastic polymer layer, and the olefin polymer layer is laminated on the other surface of said liquid crystal polymer layer through the adhesive thermoplastic polymer layer.

23. A composite film according to claim 18, wherein the polyalkylene terephthalate layer is laminated on each surface of the liquid crystal polymer layer through the adhesive thermoplastic polymer layer.

24. A composite film according to claim 1, wherein the modified polyolefin is at least one member selected from the group consisting of a carboxy modified polyolefin, a glyciyl modified polyolefin, an alkoxysilane modified polyolefin, a carboxy modified ethylene-ethyl acrylate copolymer, a gylcidyl modified ethylene-ethyl acrylate copolymer, an alkoxysilane modified ethylene-ethyl acrylate copolymer, a carboxy modified ethylene-vinyl acetate copolymer, a glycidyl modified ethylene-vinyl acetate copolymer, and an alkoxysilane modified ethylene-vinyl acetate copolymer.

25. A composite film according to claim 1, wherein the polyester is a polyester composed of (i) a polybasic acid containing 30 to 80 mol % of terephthalic acid and 20 to 70 mol % of at least one polybasic acid selected from the group consisting of adipic acid, sebacic acid and isophthalic acid, and (ii) at least one polyhydric alcohol selected from the group consisting of ethylene glycol and 1,4-butanediol.

26. A composite film according to claim 1, wherein the adhesive thermoplastic polymer layer contains 75% by weight or more of an adhesive thermoplastic polymer.

27. A composite film according to claim 1, wherein the thermoplastic polymer layer is laminated on the liquid crystal polymer layer by use of a two-component type curable urethane adhesive.

* * * * *